United States Patent
Ikuta et al.

(10) Patent No.: US 12,135,263 B2
(45) Date of Patent: Nov. 5, 2024

(54) WASHING METHOD FOR STAINING BATH IN SMEAR SAMPLE PREPARING APPARATUS, AND SMEAR SAMPLE PREPARING APPARATUS

(71) Applicant: SYSMEX CORPORATION, Kobe (JP)

(72) Inventors: Junya Ikuta, Kobe (JP); Noriyuki Nakanishi, Kobe (JP); Yugo Harada, Kobe (JP); Seiya Shinabe, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 407 days.

(21) Appl. No.: 17/071,007

(22) Filed: Oct. 15, 2020

(65) Prior Publication Data

US 2021/0116333 A1    Apr. 22, 2021

(30) Foreign Application Priority Data

Oct. 18, 2019  (JP) .................................. 2019-191347
Mar. 5, 2020  (JP) .................................. 2020-037439

(51) Int. Cl.
*G01N 1/30*    (2006.01)
*G01N 1/31*    (2006.01)

(52) U.S. Cl.
CPC ................ *G01N 1/30* (2013.01); *B01L 13/00* (2019.08); *G01N 1/312* (2013.01)

(58) Field of Classification Search
CPC ............ G01N 1/30; G01N 1/312; G01N 1/31; G01N 1/36; G01N 35/00732; G01N 35/00871; B01L 13/00; A61B 90/90; A61B 90/92; A61B 90/96; A61B 10/0096

See application file for complete search history.

(56) References Cited

U.S. PATENT DOCUMENTS 5,839,091 A    11/1998  Rhett et al.
10,145,768 B2  12/2018  Ohmae et al.
(Continued)

FOREIGN PATENT DOCUMENTS

CN    102179349 A    9/2011
CN    102236024 A    11/2011
(Continued)

OTHER PUBLICATIONS

Sysmex Corporation, Manual of Automated Hematology Slide Preparation Unit SP-50, North American Edition, Printed in Japan, Last revision made on Mar. 2020.
(Continued)

*Primary Examiner* — Matthew D Krcha
*Assistant Examiner* — Tingchen Shi
(74) *Attorney, Agent, or Firm* — BUCHANAN, INGERSOLL & ROONEY PC

(57) ABSTRACT

Disclosed is a washing method for a staining bath in a smear sample preparing apparatus. The staining bath is able to accommodate a glass slide having a specimen smeared thereon, and stores therein a staining liquid for staining the specimen smeared on the glass slide to perform a staining process. The washing method includes: receiving information related to a washing condition; and executing a washing operation for the staining bath, according to the received information.

18 Claims, 16 Drawing Sheets

(56) References Cited

U.S. PATENT DOCUMENTS

| | | | | |
|---|---|---|---|---|
| 2002/0116132 | A1* | 8/2002 | Rhett | G01N 1/312 702/19 |
| 2011/0314893 | A1 | 12/2011 | Masui | |
| 2016/0018302 | A1 | 1/2016 | Lapen et al. | |
| 2018/0058989 | A1* | 3/2018 | Nakanishi | G01N 1/30 |
| 2018/0180607 | A1* | 6/2018 | Kubo | G01N 35/0098 |

FOREIGN PATENT DOCUMENTS

| | | |
|---|---|---|
| CN | 104024867 A | 9/2014 |
| CN | 105499231 A | 4/2016 |
| CN | 106323724 A | 1/2017 |
| CN | 107076652 A | 8/2017 |
| CN | 207789783 U | 8/2018 |
| CN | 108687087 A | 10/2018 |
| CN | 110270564 A | 9/2019 |
| EP | 3290902 A1 | 3/2018 |
| EP | 3757541 A1 | 12/2020 |
| EP | 3757542 A1 | 12/2020 |
| JP | H05-149846 A | 6/1993 |
| JP | 2001021468 A | 1/2001 |
| JP | 3096279 U | 9/2003 |
| JP | 2006038781 A | 2/2006 |
| JP | 2010210569 A | 9/2010 |
| JP | 2016-519770 A | 7/2016 |
| JP | 2017-142082 A | 8/2017 |
| JP | 2018012095 A | 1/2018 |
| JP | 2018-036163 A | 3/2018 |
| JP | 2018109520 A | 7/2018 |
| WO | 95/08774 A2 | 3/1995 |
| WO | 2016084377 A1 | 6/2016 |

OTHER PUBLICATIONS

Office Action (Communication pursuant to Article 94(3) EPC) issued Oct. 6, 2022, by the European Patent Office in corresponding European Patent Application No. 20 201 743.0. (9 pages).

Extended European Search Report issued on Mar. 12, 2021, by the European Patent Office in corresponding European Patent Application No. 20201743.0. (13 pages).

Office Action (Notice of Reasons for Refusal) issued Jul. 18, 2023, by the Japan Patent Office in corresponding Japanese Patent Application No. 2020-037439, and an English translation of the Office Action. (8 pages).

Office Action (Communication pursuant to Article 94(3) EPC) issued Nov. 14, 2023, by the European Patent Office in corresponding European Patent Application No. 20201743.0. (4 pages).

Chinese Office Action issued on Mar. 13, 2024 in a counterpart Chinese patent application No. 202011108568.7, 20 pages.

Office Action (Communication pursuant to Article 94(3) EPC) issued on Jul. 23, 2024, by the European Patent Office in corresponding European Application No. 20 201 743.0-1001, 8 pages.

* cited by examiner

WASHING METHOD FOR STAINING BATH IN SMEAR SAMPLE PREPARING APPARATUS, AND SMEAR SAMPLE PREPARING APPARATUS

CROSS REFERENCE TO RELATED APPLICATIONS

This application claims priority from prior Japanese Patent Application No. 2019-191347, filed on Oct. 18, 1019, and prior Japanese Patent Application No. 2020-037439, filed on Mar. 5, 2020, entitled "WASHING METHOD FOR STAINING BATH IN SMEAR SAMPLE PREPARING APPARATUS, AND SMEAR SAMPLE PREPARING APPARATUS", the entire content of which is incorporated herein by reference.

FIELD OF THE INVENTION

The present invention relates to a washing method for a staining bath in a smear sample preparing apparatus, and the smear sample preparing apparatus.

BACKGROUND

Japanese Laid-Open Patent Publication No. 2001-21468 discloses a staining apparatus 900 including a fixative bath 901, a first staining liquid bath 902, a second staining liquid bath 903, and a washing liquid bath 904, as shown in FIG. 28. A fixative 911 is stored in the fixative bath 901, a first staining liquid 912 is stored in the first staining liquid bath 902, a second staining liquid 913 is stored in the second staining liquid bath 903, and a washing liquid 914 for a sample 910 is stored in the washing liquid bath 904. The sample 910 is a glass slide having blood smeared thereon. The staining apparatus 900 performs a staining process by sequentially immersing the sample 910 in the fixative 911 stored in the fixative bath 901, the first staining liquid 912 stored in the first staining liquid bath 902, the second staining liquid 913 stored in the second staining liquid bath 903, and the washing liquid 914 stored in the washing liquid bath 904 in this order.

In Japanese Laid-Open Patent Publication No. 2001-21468, if the staining liquid is left stored in the staining liquid bath, solid components are precipitated from the staining liquid. The precipitated solid components are adhered to the sample 910 with elapse of the operation period of the staining apparatus 900. The solid component adhered to the sample 910 is likely to hinder microscopic observation or the like, which may cause reduction in the quality of the sample 910.

In order to prevent such adhesion of a solid component to a sample, washing of a staining liquid bath is performed with a washing liquid stored in the staining liquid bath. However, there are cases where an appropriate washing process cannot be performed.

SUMMARY OF THE INVENTION

The scope of the present invention is defined solely by the appended claims, and is not affected to any degree by the statements within this summary.

In order to achieve the above object, a washing method according to a first aspect of the present invention is a washing method for a staining bath in a smear sample preparing apparatus. The staining bath is able to accommodate a glass slide having a specimen smeared thereon, and store therein a staining liquid for staining the specimen smeared on the glass slide to perform a staining process. The washing method includes: receiving information related to a washing condition; and executing a washing operation for the staining bath, according to the received information.

According to the washing method of the present invention, the washing operation for the staining bath can be executed according to the received information. As a result, an appropriate washing operation is executed according to the state of the smear sample preparing apparatus, whereby an appropriate washing process for the staining bath can be executed according to the state of the smear sample preparing apparatus.

A smear sample preparing apparatus according to a second aspect of the present invention includes: a staining bath being able to accommodate a glass slide having a specimen smeared thereon, and store therein a staining liquid for staining the specimen smeared on the glass slide to perform a staining process; a fluid circuit unit configured to perform supply and discharge of the staining liquid and supply and discharge of a washing liquid to and from the staining bath; a storage unit configured to store therein a set value of a washing condition; and a controller programmed to control the fluid circuit unit so as to wash the staining bath, according to the set value of the washing condition stored in the storage unit. The controller receives a setting of the set value of the washing condition stored in the storage unit.

In the smear sample preparing apparatus according to the second aspect of the present invention, the staining bath can be washed according to the set value of the washing condition stored in the storage unit, and a setting of the set value of the washing condition stored in the storage unit can be received. As a result, an appropriate washing operation is executed according to the state of the smear sample preparing apparatus, whereby an appropriate washing process for the staining bath can be executed according to the state of the smear sample preparing apparatus.

A washing method according to a third aspect of the present invention is a washing method for a staining bath in a smear sample preparing apparatus operable in a plurality of operation modes. The staining bath is able to accommodate a glass slide having a specimen smeared thereon, and store therein a staining liquid for staining the specimen smeared on the glass slide to perform a staining process. The washing method includes: selecting at least one operation mode from among the plurality of operation modes; and executing a washing operation for the staining bath, according to the selected operation mode.

In the washing method according to the third aspect of the present invention, the washing operation for the staining bath can be executed according to the selected operation mode. As a result, an appropriate washing operation is executed according to the state of the smear sample preparing apparatus, whereby an appropriate washing process for the staining bath can be executed according to the state of the smear sample preparing apparatus.

A smear sample preparing apparatus according to a fourth aspect of the present invention is operable in a plurality of operation modes, and includes: a staining bath being able to accommodate a glass slide having a specimen smeared thereon, and store therein a staining liquid for staining the specimen smeared on the glass slide to perform a staining process; a fluid circuit unit configured to perform supply and discharge of the staining liquid and supply and discharge of a washing liquid to and from the staining bath; and a controller programmed to control a washing operation for the staining bath performed by the fluid circuit unit, according to an operation mode selected from among the plurality of operation modes.

In the smear sample preparing apparatus according to the fourth aspect of the present invention, the washing operation for the staining bath performed by the fluid circuit unit can be controlled according to the selected operation mode. As a result, an appropriate washing operation is executed according to the state of the smear sample preparing apparatus, whereby an appropriate washing process for the staining bath can be executed according to the state of the smear sample preparing apparatus.

According to the present invention, an appropriate washing process for the staining bath can be executed according to the state of the smear sample preparing apparatus.

DETAILED DESCRIPTION OF THE PREFERRED EMBODIMENTS

Figure 1:
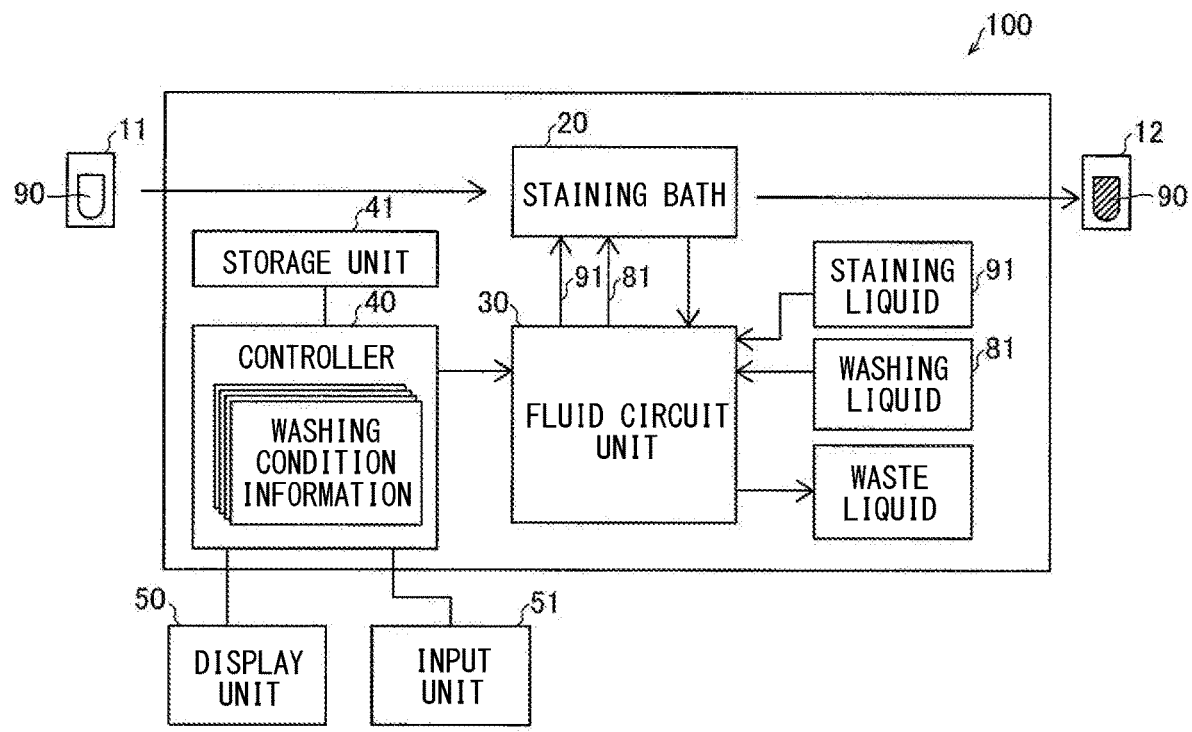
FIG. 1 is a schematic diagram showing an outline of a smear sample preparing apparatus according to one embodiment.

Hereinafter, an embodiment will be described with reference to the drawings.

(Outline of Washing Method)

The outline of a washing method according to the present embodiment will be described with reference to FIG. 1 and FIG. 2. The washing method is a method for washing a staining bath 20 of a smear sample preparing apparatus 100.

The smear sample preparing apparatus 100 includes a staining bath 20. The staining bath 20 can accommodate a plurality of glass slides 11 each having a specimen 90 smeared thereon. The staining bath 20 stores therein a staining liquid 91 for staining the specimen 90 smeared on each glass slide 11, thereby performing a staining process. The smear sample preparing apparatus 100 is configured to execute a washing operation for the staining bath 20 while receiving washing condition information related to a washing condition. The staining bath 20 is not necessarily configured to accommodate a plurality of glass slides 11 each having a specimen smeared thereon, and may be configured to store only one glass slide 11 having a specimen smeared thereon.

The specimen 90 is blood, for example. In this case, the staining bath 20 stains cells such as blood cells contained in blood, with the staining liquid 91. As the staining liquid 91, well-known staining solutions, such as Giemsa solution, May-Grunwald solution, and Wright solution, are adoptable. The specimen 90 may be urine, a piece of tissue, or the like. The glass slide 11 having the specimen 90 smeared thereon is transferred into the staining bath 20. The glass slide 11 having the specimen 90 smeared thereon is immersed in the staining liquid 91 stored in the staining bath 20. The glass slide 11 having the specimen 90 smeared thereon is taken out from the staining bath 20 after having been immersed in the staining liquid 91 for a predetermined staining time. Thus, a stained smear sample slide 12 is prepared.

From the staining liquid 91 stored in the staining bath 20, components in the staining liquid 91 are precipitated with elapse of time. The precipitates accumulate as dirt on an inner wall surface of the staining bath 20. Since the precipitates also adhere to the smear sample slide 12 during staining, accumulation of the precipitates may cause reduction in the quality of the prepared smear sample slide 12. Therefore, the smear sample preparing apparatus 100 performs the washing operation for the staining bath 20. In order to inhibit fixation of dirt, the washing operation for the staining bath 20 is performed when the smear sample preparing apparatus 100 is shut down, for example. The washing operation can be executed not only at shutdown but also at activation of the smear sample preparing apparatus 100, or at any timing during operation.

Washing of the staining bath 20 is desired to be performed such that accumulation of dirt of the staining bath 20 is within an allowable range even when the smear sample preparing apparatus 100 is operated for long hours. However, the degree of dirt of the staining bath 20 varies depending on the usage pattern for each user and the operation state of the smear sample preparing apparatus 100, and also varies depending on the type of the adopted staining liquid. For example, dirt is relatively likely to adhere to the staining bath 20 when the frequency of use of the smear sample preparing apparatus 100 within a fixed period of time is higher than the standard frequency of use, when the continuous operation time is long such as when the smear sample preparing apparatus 100 is operated for 24 hours, or when the viscosity of the adopted staining liquid 91 is higher than that of the average staining liquid. Meanwhile, dirt is relatively less likely to adhere to the staining bath 20 when the frequency of use of the smear sample preparing apparatus 100 is low, when the continuous operation time of the smear sample preparing apparatus 100 is short, or when the viscosity of the adopted staining liquid 91 is low. Depending on the state of the smear sample preparing apparatus 100, the content of a washing operation suitable for removing dirt varies.

Figure 2:
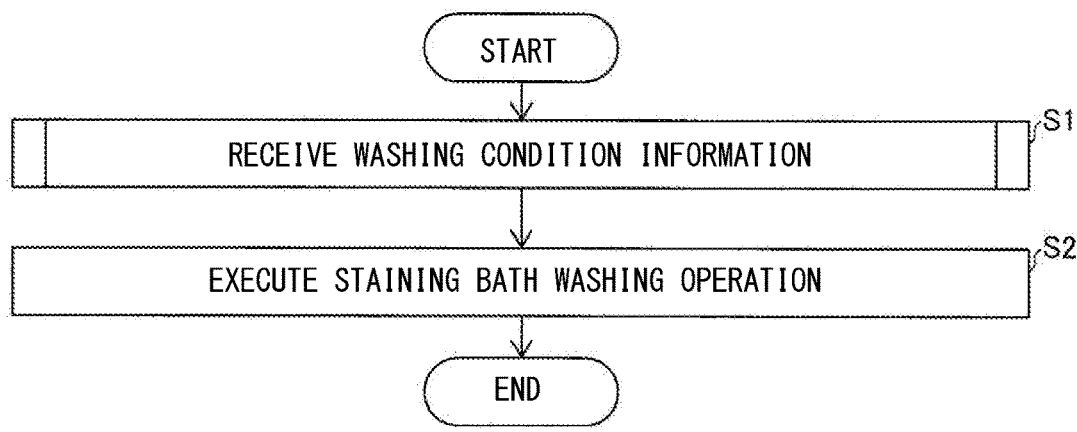
FIG. 2 is a flowchart of a staining bath washing method according to the embodiment.

Therefore, as shown in FIG. 2, the washing method for the staining bath 20 according to the present embodiment includes steps S1 and S2 as follows:

(S1) receiving washing condition information related to a washing condition; and (S2) executing a washing operation for the staining bath 20 according to the received washing condition information.

In step S1, washing condition information for the smear sample preparing apparatus 100 is received.

In step S2, the smear sample preparing apparatus 100 is controlled to execute a washing operation according to the received washing condition information. For example, the smear sample preparing apparatus 100 is controlled so as to supply, to the staining bath 20, a washing liquid 81 of a type and a concentration/amount according to the washing condition. For example, the smear sample preparing apparatus 100 is controlled so as to execute the washing operation by the number of times according to the washing condition. For example, the smear sample preparing apparatus 100 is controlled so as to execute the washing operation by use of one or a plurality of washing methods according to the washing condition.

As described above, in the staining bath washing method according to the present embodiment, the staining bath 20 is subjected to different washing operations depending on the received washing condition information, whereby an appropriate washing operation can be executed. As a result, an appropriate washing process can be executed for the staining bath 20 according to the state of the smear sample preparing apparatus 100 by selecting an appropriate washing condition according to the state of the smear sample preparing apparatus 100.

The washing liquid 81 used for washing the staining bath 20 includes, but is not particularly limited to, an organic solvent, for example. The washing liquid 81 may be formed by further including a buffer, a surfactant, a salt, or the like. Examples of the organic solvent include alcohols such as methanol and ethanol, for example. The buffer may be PBS (phosphate buffered saline), EDTA (ethylene diamine tetraacetic acid), or the like. As for the surfactant, an appropriate one is selected from among nonionic surfactants, amphoteric surfactants, anionic surfactants, cationic surfactants, etc. Here, "salt" is a compound in which an anion derived from an acid and a cation derived from a base are bound to each other through an ionic bond. Examples of the salt may include HCl, NaCl, and $Na_2HPO_4$.

(Outline of Smear Sample Preparing Apparatus)

Next, the outline of the smear sample preparing apparatus 100 according to the present embodiment will be described. The smear sample preparing apparatus 100 is an apparatus for automatically preparing a smear sample slide 12 by performing a staining process on a glass slide 11 having a specimen smeared thereon.

As shown in FIG. 1, the smear sample preparing apparatus 100 includes a staining bath 20, a fluid circuit unit 30, a storage unit 41, and a controller 40.

The staining bath 20 performs a smearing process for the specimen on the glass slide 11 which has already been subjected to a smearing process. As described above, the staining bath 20 can accommodate a plurality of glass slides 11 each having the specimen 90 smeared thereon. The staining bath 20 stores therein the staining liquid 91 for staining the specimen 90 smeared on the glass slide 11 to perform the staining process. The staining bath 20 has a container shape having an opened upper portion, a bottom surface, and a peripheral side surface, for example. The staining bath 20 stores the staining liquid 91 in a storage space defined by the bottom surface and the peripheral side surface. The staining bath 20 receives the glass slides 11 from the opened upper portion, for example.

The fluid circuit unit 30 is fluidly connected to the staining bath 20, and is configured to supply and discharge liquid to and from the staining bath 20. That is, the fluid circuit unit 30 performs supply and discharge of the staining liquid 91, and supply and discharge of the washing liquid 81, to and from the staining bath 20. When performing the staining process, the fluid circuit unit 30 supplies the staining liquid 91 to the staining bath 20. When performing a washing operation, the fluid circuit unit 30 discharges the staining liquid 91 from the staining bath 20, and supplies the washing liquid 81 to the staining bath 20. The fluid circuit unit 30 discharges the washing liquid 81 from the staining bath 20 to end the washing operation. The fluid circuit unit 30 sends the staining liquid 91 and the washing liquid 81 discharged from the staining bath 20, as a waste liquid, to a waste liquid container or the like. The fluid circuit unit 30 includes pumps and valves for transferring liquid, and flow paths connected to the staining bath 20.

The storage unit 41 stores therein a set value of a washing condition. The set value of the washing condition stored in the storage unit 41 is a variable parameter. The set value of the washing condition stored in the storage unit 41 may be an initial set value that has previously been stored in the storage unit 41 upon delivery or shipping of the smear sample preparing apparatus 100.

The controller 40 controls the respective components of the smear sample preparing apparatus 100. The controller 40 includes, for example, a processor that performs arithmetic processing, and a memory that stores a program therein. The controller 40 controls supply and discharge of liquid to and from the staining bath 20 performed by the fluid circuit unit 30.

The controller 40 controls the washing operation for the staining bath 20 performed by the fluid circuit unit 30, according to the variable set value of the washing condition stored in the storage unit 41. That is, the controller 40 executes the washing method for the staining bath 20 according to the present embodiment. The controller 40 executes processes in steps S1 and S2 shown in FIG. 2, thereby controlling the washing operation for the staining bath 20 performed by the fluid circuit unit 30, according to washing condition information having been received. In addition, the controller 40 receives a change in the set value of the washing condition stored in the storage unit 41. When receiving a change in the set value of the washing condition, the controller 40 stores the changed set value in the storage unit 41.

With the above configuration, according to the smear sample preparing apparatus 100 of the present embodiment, it is possible to execute an appropriate washing operation according to the variable set value of the washing condition stored in the storage unit 41. As a result, an appropriate washing process can be executed for the staining bath 20 according to the state of the smear sample preparing apparatus 100 by selecting an appropriate washing operation according to the state of the smear sample preparing apparatus 100.

(Example of Washing Operation)

Figure 3:
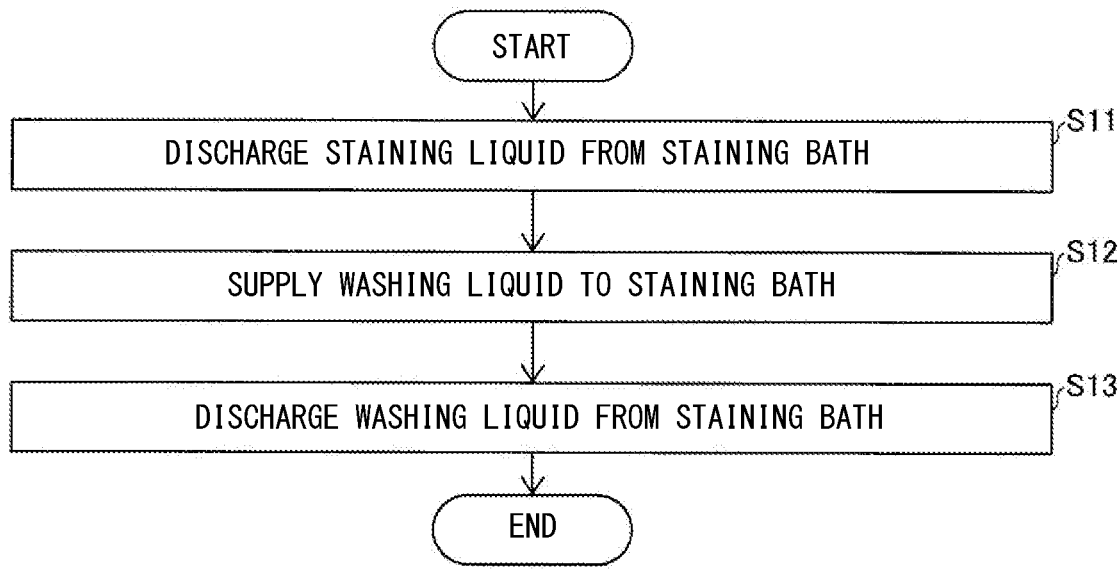
FIG. 3 is a flowchart of an outline of a washing operation.

In an example shown in FIG. 3, a washing operation executing step includes: (S11) discharging the staining liquid 91 from the staining bath 20; (S12) supplying the washing liquid 81 to the staining bath 20; and (S13) discharging the washing liquid 81 from the staining bath 20.

These steps are executed by the fluid circuit unit 30 under the control of the controller 40. In step S11, the controller 40 controls the fluid circuit unit 30 so as to discharge the staining liquid 91 from the staining bath 20. The staining bath 20 is emptied. In step S12, the controller 40 controls the fluid circuit unit 30 so as to supply the washing liquid 81 to the staining bath 20. The washing liquid 81 is stored in the staining bath 20, and is kept stored for a certain period of time. Thus, immersion washing for the staining bath 20 is performed. In step S13, the controller 40 controls the fluid circuit unit 30 so as to discharge the washing liquid 81 from the staining bath 20.

Thus, the staining bath 20 can be washed by the washing liquid 81 supplied to the staining bath 20.

(Washing Operation)

Figure 4:
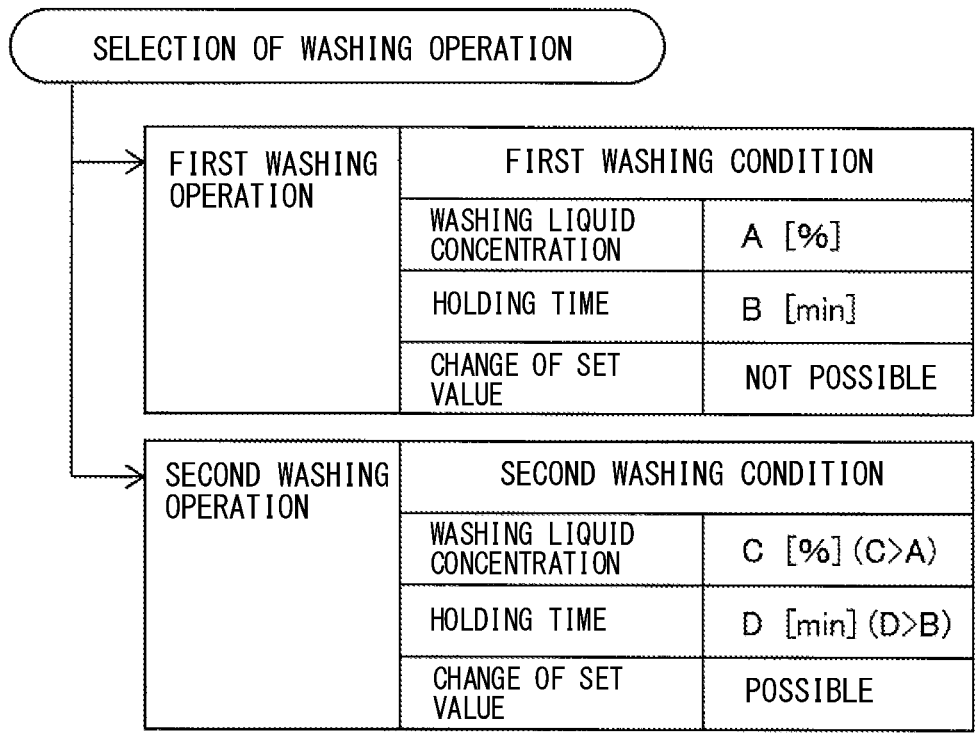
FIG. 4 illustrates a first washing operation and a second washing operation.

An example shown in FIG. 4 shows a first washing operation and a second washing operation having different washing effects. Specifically, FIG. 4 shows set values of a first washing condition corresponding to the first washing operation, and set values of a second washing condition corresponding to the second washing operation. The set values of the first washing condition include a washing liquid concentration A [%] and a holding time B [min]. The set values of the second washing condition include a washing liquid concentration C [%] and a holding time D [min]. The set values of the first washing condition and the set values of the second washing condition are stored in the storage unit 41 (see FIG. 1). In FIG. 4, the set values of the first washing condition are indicated as invariable parameters, and the set values of the second washing condition are indicated as variable parameters. However, both the set values of the first washing condition and the set values of the second washing condition may be variable parameters. The controller 40 causes the fluid circuit unit 30 to execute the washing operations having different washing effects, according to the first washing condition or the second washing condition that is the received washing condition information.

Thus, a washing operation that provides an appropriate washing effect can be selected from among the plurality of washing operations, according to the state of the smear sample preparing apparatus 100. As a result, long-term retention of performance of the smear sample preparing apparatus 100 and appropriate maintenance of the smear sample preparing apparatus 100 can be achieved.

The first washing operation corresponding to the first washing condition and the second washing operation corresponding to the second washing condition have different washing effects. For example, each washing condition includes a condition regarding the concentration of the washing liquid. For example, each washing condition includes a condition regarding the washing time.

When the first washing operation is selected from among the plurality of washing operations, the first washing operation according to the first washing condition is executed. When the second washing operation is selected from among the plurality of washing operations, the second washing operation according to the second washing condition is executed. The second washing operation has a higher washing effect than the first washing operation.

Thus, according to the state of the smear sample preparing apparatus 100, the first washing operation is selected when the degree of dirt of the staining bath 20 is normal, and the second washing operation having the higher washing effect is selected when the degree of dirt of the staining bath 20 is high. For example, the first washing operation is selected for daily washing while the second washing operation having the higher washing effect is selected for periodical maintenance or for washing before consecutive holidays or the like, whereby the smear sample preparing apparatus 100 can be managed while preventing accumulation of dirt on the staining bath 20.

In the example shown in FIG. 4, in the washing operation executing step, the concentration of the washing liquid 81 used for the washing operation varies depending on the washing condition. That is, the washing operations having different washing effects have different concentrations of the washing liquid 81 used for the washing operations. Here, the concentration of the washing liquid means the concentration of a washing component contained in the washing liquid 81. When the washing liquid 81 is prepared by mixing the washing liquid 81 in undiluted form (i.e., stock liquid) and a diluent, the concentration of the washing liquid 81 can be a mixing ratio of the stock liquid to the diluent. The higher the concentration of the washing liquid is, the higher the washing effect becomes. The lower the concentration of the washing liquid is, the lower the washing effect becomes. Thus, washing operations having different washing effects can be performed even when the holding time of the washing liquid 81 in the staining bath 20 is the same.

For example, in the first washing operation shown in FIG. 4, the washing liquid 81 having a concentration A [%] as a set value of the first washing condition, is used. In the second washing operation, the washing liquid 81 having a concentration C [%] as a set value of the second washing condition, is used. Here, C>A. Therefore, the washing effect of the second washing operation becomes higher than that of the first washing operation. The concentrations of the washing liquid satisfy 0%<A<C≤100%.

In the example shown in FIG. 4, in the washing operation executing step, the holding time of the washing liquid 81 in the staining bath 20 varies depending on the washing condition. That is, the washing operations having different washing effects have different holding times of the washing liquid 81 in the staining bath 20. Here, the holding time of the washing liquid is a time period from when the washing liquid 81 is stored in the staining bath 20 to when the washing liquid 81 is discharged. The longer the holding time is, the higher the washing effect becomes. The shorter the holding time is, the lower the washing effect becomes. Thus, washing operations having different washing effects can be performed even when the washing liquid 81 of the same concentration is used.

For example, in the first washing operation shown in FIG. 4, the holding time of the washing liquid 81 is B [min] as a set value of the first washing condition. In the second washing operation, the holding time of the washing liquid 81 is D [min] as a set value of the second washing condition. Here, D>B. Therefore, the washing effect of the second washing operation is higher than that of the first washing operation. The holding times of the washing liquid satisfy 0<B<D [min]. An upper-limit value of the holding time is not particularly limited, but can be, in practical terms, 100 [min], 120 [min], 150 [min], or 200 [min], for example.

The method for making washing operations have different washing effects is not limited to the above methods. For example, whether or not to perform ultrasonic wave washing in addition to the immersion washing with the washing liquid 81, may be used. Only the immersion washing is executed in the first washing operation, while both the immersion washing and the ultrasonic wave washing are executed in the second washing operation. Alternatively, for example, the temperature of the washing liquid 81 supplied to the staining bath 20 may be varied. The washing liquid 81 having the first temperature is supplied in the first washing operation, while the washing liquid 81 having a second temperature higher than the first temperature is supplied in the second washing operation. Still alternatively, for example, the number of times the washing operation is executed may be varied. The washing operation shown in FIG. 3 is executed a first number of times in the first washing operation, while the washing operation is executed a second number of times, greater than the first number of times, in the second washing operation. Thus, the washing effect of the washing operation according to the washing condition information may be varied by any method.

<Setting of Set Value of Washing Condition>

A set value of each washing condition may be a parameter that is preset and invariable, or may be a variable parameter. A washing condition whose set value is preset to a fixed value and a washing condition whose set value is variable may coexist.

That is, in the example shown in FIG. 4, the controller 40 is configured to be able to vary the set values of the washing conditions. Thus, each user is allowed to change a set value of a washing condition so as to generate an optimum washing effect, according to the usage environment of the smear sample preparing apparatus 100. As a result, the washing operation for the staining bath 20 can be optimized according to the purpose of each user.

Specifically, the set value of the first washing condition corresponding to the first washing operation is a fixed value, and cannot be changed. Meanwhile, the set value of the second washing condition corresponding to the second washing operation is changeable. The controller 40 changes the set value of the washing liquid concentration and the set value of the holding time, according to an operation input, for example.

For example, the first washing operation is a washing operation to be performed with the standard washing condition, while the second washing operation is a washing operation to be performed with the washing condition being arbitrarily changeable. A user can operate the smear sample preparing apparatus 100 while appropriately using the first washing operation and the second washing operation. The smear sample preparing apparatus 100 is configured to be operated under a plurality modes including: a service mode in which the smear sample preparing apparatus 100 is operated by a service person having specialized knowledge at periodical maintenance of the apparatus 100; and a user mode in which a user, who uses the smear sample preparing apparatus 100, operates the apparatus 100. Preferably, the washing condition can be changed in the service mode, and cannot be changed in the user mode. The user mode includes a normal mode and an advanced mode. The washing condition can be changed in the advanced mode while the washing condition cannot be changed in the normal mode. Here, the normal mode is a mode in which a typical user, who uses the smear sample preparing apparatus 100, operates the apparatus 100, and the advanced mode is a mode in which an administrator of the smear sample preparing apparatus 100 operates the apparatus 100. In the service mode and the advanced mode, a reception screen 60 shown in FIG. 5 described later is displayed to allow an operation in a first mode in which the washing condition can be changed. In the normal mode, the reception screen 60 shown in FIG. 5 described later is not displayed to allow an operation in a second mode in which the washing condition cannot be changed. That is, the smear sample preparing apparatus 100 can be configured to operate in the plurality of modes. At this time, the plurality of modes can include the first mode in which the reception screen 60 is displayed, and the second mode in which the reception screen 60 is not displayed. Thus, a user who lacks specialized knowledge regarding maintenance is prevented from setting an inappropriate value by mistake.

Setting of a set value of a washing condition is performed by use of a display unit 50 (see FIG. 1) and an input unit 51 (see FIG. 1), for example. Thus, the smear sample preparing apparatus 100 may further include the display unit 50 (see FIG. 1) performing screen display, and the input unit 51 (see FIG. 1) receiving an operation input. The display unit 50 may be a liquid crystal display or an EL (Electro Luminescence) display, for example. The input unit 51 may be an input device such as a keyboard, a mouse, or a touch panel.

As an example of a method for setting a set value of a washing condition, for example, step S1 of receiving the washing condition information shown in FIG. 2 includes: a step of presenting the reception screen 60 (see FIG. 5) for receiving a change in the set value of the washing condition; and a step of receiving, through the reception screen 60, a change in the set value of the washing condition, as washing condition information. The controller 40 is configured to execute: a process of causing the display unit 50 to changeably display the set value of the washing condition stored in the storage unit 41; and a process of causing the input unit 51 to receive a change in the set value of the washing condition stored in the storage unit 41.

Figure 5:
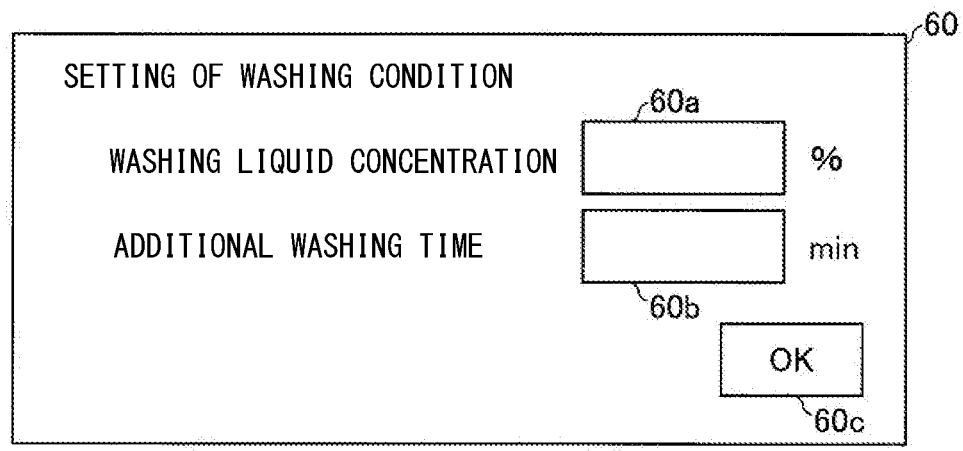
FIG. 5 shows an example of a setting input screen related to washing conditions.

That is, in FIG. 5, the controller 40 causes the display unit 50 to display the reception screen 60 for receiving set values of the washing condition. The reception screen 60 includes a concentration input box 60a, a time input box 60b, and an OK button 60c. The controller 40 receives an input operation performed by the user through the input unit 51. Thus, setting of a washing operation necessary for maintaining the function of the smear sample preparing apparatus 100 can be performed without accompanying a work such as rewriting of the program of the controller 40.

When the user selects the concentration input box 60a and inputs a desired value, the controller 40 receives an input of the set value of the washing liquid concentration. When the user selects the time input box 60b and inputs a desired value, the controller 40 receives an input of the set value of the holding time. After the input of the set value, when the user presses the OK button 60c, the set value is determined.

Figure 6:
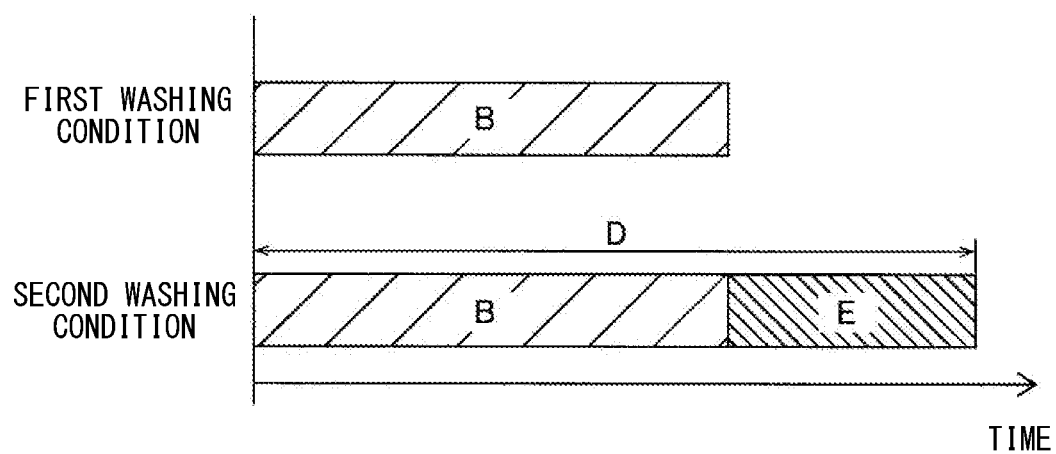
FIG. 6 illustrates washing liquid holding times in the washing conditions.

As for the holding time, a value of the holding time may be inputted, or a value of an additional time with respect to a reference time may be inputted. In the example shown in FIG. 5, a value E of a time to be added to the holding time B as the set value of the first washing condition, in the set value of the second washing condition, is inputted to the time input box 60b. In this case, as shown in FIG. 6, the controller 40 sets the holding time D as the second washing condition to D=B+E.

<Another Example of Washing Operation>

Although two washing operations, i.e., the first washing operation and the second washing operation, are shown in FIG. 4, a third washing operation may be adopted. For example, when the third washing operation is selected, a third washing operation having a lower washing effect than the first washing operation is executed. The third washing operation can be a washing operation in which the consumption of the washing liquid 81 or the time required for the washing operation is reduced. For example, when a user operates the smear sample preparing apparatus 100 for an operation time shorter than the general operation time or when a user reduces the density (tone) of sample staining, the degree of adhesion of dirt is relatively reduced. For such a user, routinely selecting the third washing operation leads to reduction in consumption of the washing liquid 81 while inhibiting accumulation of dirt on the staining bath 20. Then, if the user selects, according to need, the first washing operation or the second washing operation at periodical maintenance, for example, accumulation of dirt on the staining bath 20 can be effectively inhibited. Meanwhile, washing operations using different washing methods but providing almost the same washing effect, may be adopted.

(Washing Condition Selection Method)

A specific example of the step of receiving washing condition information shown in step S1 in FIG. 2 will be described below.

Figure 7:
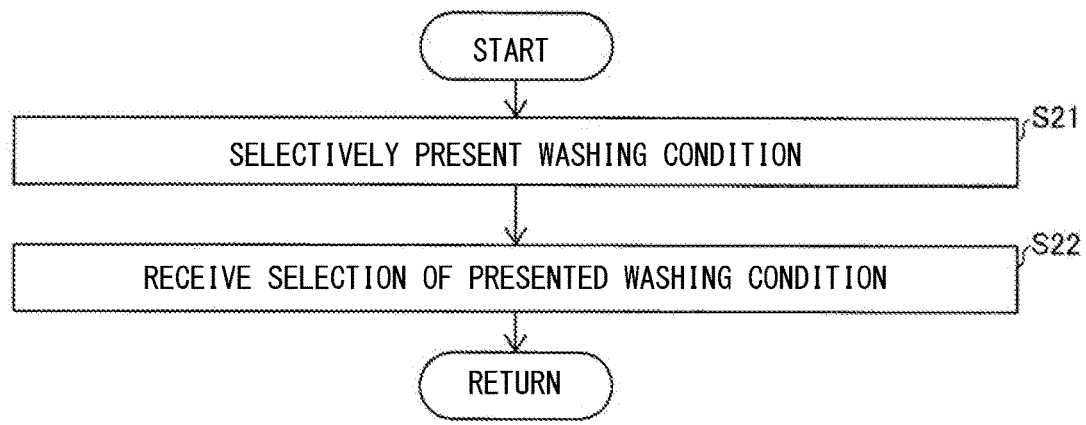
FIG. 7 is a flowchart of a first example of a washing condition selecting step.

In an example shown in FIG. 7, the step of receiving washing condition information includes: (S21) selectively presenting washing conditions; and (S22) receiving, as washing condition information, selection from the presented washing conditions. This allows the user to select the washing condition while considering the state of the smear sample preparing apparatus 100 at the time of presentation of the washing conditions, or situation such as an operation schedule of the smear sample preparing apparatus 100.

First, in step S21, the controller 40 performs a process of causing the display unit 50 to display washing conditions in a selectable manner. For example, the controller 40 causes the display unit 50 to display an operation screen 61 shown in FIG. 8. In the example shown in FIG. 8, the operation screen 61 can receive an instruction to execute the first washing operation of executing the washing operation for the staining bath 20 with the first washing condition, or the second washing operation of executing the washing operation for the staining bath 20 with the second washing condition. As described above, the first washing condition and the second washing condition are stored in the storage unit 41.

In step S22, the controller 40 performs a process of causing the input unit 51 to receive, as washing condition information, selection from the displayed washing conditions. The controller 40 is configured to execute a process of receiving, as washing condition information, an instruction to execute at least one of the first washing operation and the second washing operation through the operation screen 61.

Figure 8:
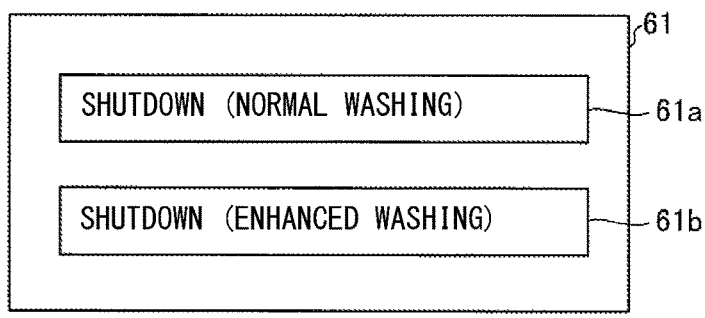
FIG. 8 shows a first example of an operation screen.

For example, in the example shown in FIG. 8, the controller 40 causes the display unit 50 to display the operation screen 61 on which a plurality of washing operations are displayed in a selectable manner. In this example, the controller 40 is configured to execute: a process of causing the display unit 50 to selectively display a plurality of washing conditions stored in the storage unit 41; and a process of causing the input unit 51 to receive, as washing condition information, selection from the displayed washing conditions. Specifically, the operation screen 61 includes: a button 61a which receives an instruction to execute the first washing operation corresponding to normal washing as the first washing condition; and a button 61b which receives an instruction to execute the second washing operation corresponding to enhanced washing as the second washing condition. When the user presses one of the button 61a and the button 61b, the controller 40 receives, as washing condition information, the inputted washing operation execution instruction. The washing operation is executed as a part of a shutdown process. FIG. 8 shows an example of simultaneously receiving selection of a washing condition corresponding to a washing operation, and an instruction to execute the washing operation (shutdown process).

As another example of FIG. 8, when the smear sample preparing apparatus 100 is operable in a plurality of operation modes, the plurality of operation modes may be respectively associated with a plurality of washing operations of different washing conditions. For example, a first operation mode and a second operation mode having different contents of staining processes may be respectively associated with washing operations having different washing effects. When an operation input is made on an execution instruction button for the first operation mode, the first washing operation corresponding to normal washing is executed. When an operation input is made on an execution instruction button for the second operation mode, the second washing operation corresponding to enhanced washing having a higher washing effect than the first washing operation is executed. An example of the first operation mode is a single staining mode of performing the staining process by use of one type of staining liquid. An example of the second operation mode is a double staining mode of performing the staining process by use of two types of staining liquids. The controller 40 of the smear sample preparing apparatus 100 controls the washing operation for the staining bath 20 performed by the fluid circuit unit 30, according to the operation mode selected from among the plurality of operation modes.

As described above, the washing method according to one aspect is a washing method for the staining bath 20 in the smear sample preparing apparatus 100 operable in a plurality of operation modes, and the method includes a step of selecting at least one operation mode from among the plurality of operation modes, and a step of executing a washing operation for the staining bath 20, according to the selected operation mode. The plurality of operation modes may include the first operation mode and the second operation mode whose staining process is different from that of the first operation mode. Thus, the washing operation for the staining bath 20 can be executed according to the selected operation mode. As a result, an appropriate washing process for the staining bath 20 can be executed according to the state of the smear sample preparing apparatus 100 by executing an appropriate washing operation according to the state of the smear sample preparing apparatus 100.

Figure 9:
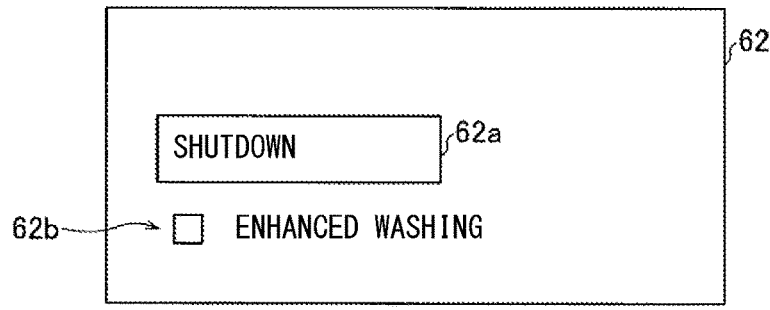
FIG. 9 shows a second example of an operation screen.
Figure 10:
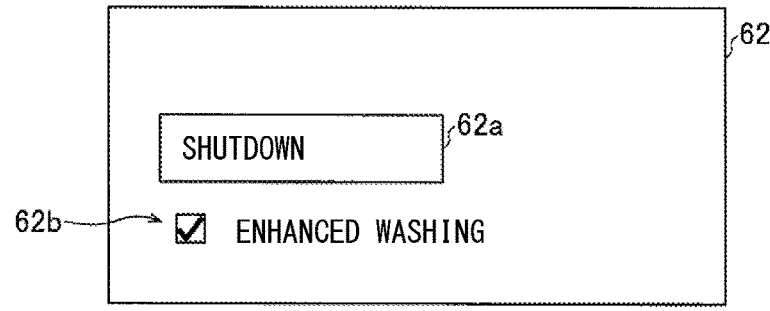
FIG. 10 shows a state where enhanced washing is selected in FIG. 9.

In an example shown in FIG. 9, the controller 40 causes the display unit 50 to display an operation screen 62 on which enhanced washing that is a washing condition corresponding to one washing operation is displayed in a selectable manner. The operation screen 62 includes: a button 62a which receives an instruction to execute normal washing as the first washing condition corresponding to the first washing operation; and a check box 62*b* which allows ON/OFF of enhanced washing as the second washing condition corresponding to the second washing operation. FIG. 9 shows a state where the check box 62*b* is not selected (OFF). When the button 62*a* is pressed in this state, the controller 40 receives, as washing condition information, selection of normal washing as the first washing condition corresponding to the first washing operation. FIG. 10 shows a state where the check box 62*b* is selected (ON). When the button 62*a* is pressed, the controller 40 receives, as washing condition information, selection of enhanced washing as the second washing condition corresponding to the second washing operation, through the check box 62*b*, and executes the washing operation. Thus, not all the plurality of washing conditions corresponding to the plurality of washing operations need to be displayed in a selectable manner. FIG. 9 and FIG. 10 each show an example in which selection of a washing condition corresponding to a washing operation and an instruction to execute a washing operation (shutdown process) are separately received.

The washing operation presentation method is not limited to the examples shown in FIG. 8 to FIG. 10. The controller 40 may project and display an operation screen by use of a projector to present options, for example. The controller 40 may display an operation screen on a display screen of an information terminal communicably connected to the smear sample preparing apparatus 100, for example. The information terminal may be a smartphone, a tablet, a notebook PC, or the like, for example. In this case, the controller 40 may obtain a result of an operation input performed on the information terminal, thereby receiving, as washing condition information, selection of a washing condition corresponding to a washing operation.

Figure 11A:
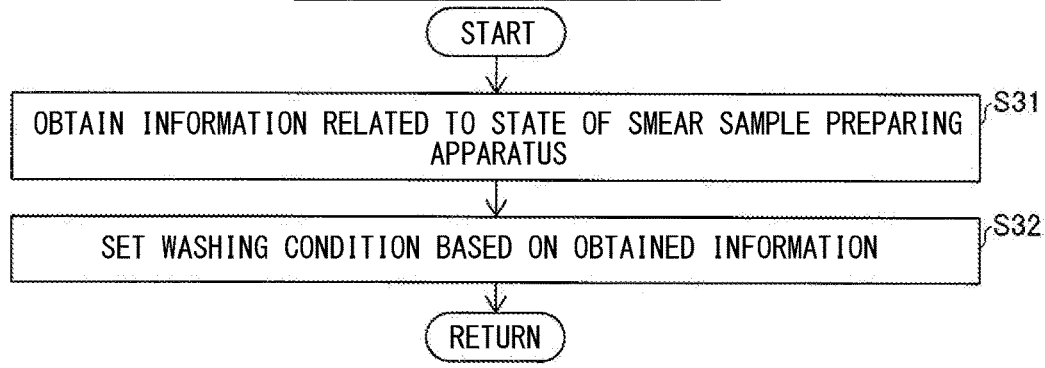
FIG. 11A is a flowchart of a second example of a washing condition setting step.

In an example shown in FIG. 11A, a step of receiving washing condition information includes: (S31) obtaining information related to the state of the smear sample preparing apparatus 100 as washing condition information; and (S32) setting a washing condition based on the obtained information. That is, setting of a washing condition is performed without receiving a selection operation by the user as washing condition information. Thus, the user need not check and judge the state of the smear sample preparing apparatus 100 for each washing operation, and a washing condition corresponding to an appropriate washing operation can be automatically set. In addition, a washing operation corresponding to an appropriate washing condition can be set even when the user does not grasp the state of the smear sample preparing apparatus 100.

In step S31, the controller 40 obtains information 70 (see FIG. 12) related to the state of the smear sample preparing apparatus 100.

In step S32, the controller 40 sets a washing condition, based on the obtained information 70. Thus, in the example shown in FIGS. 11A and 11B, the controller 40 is configured to obtain the information 70 related to the state of the smear sample preparing apparatus 100, and set one washing condition from among a plurality of washing conditions stored in the storage unit 41, based on the obtained information.

Figure 12:
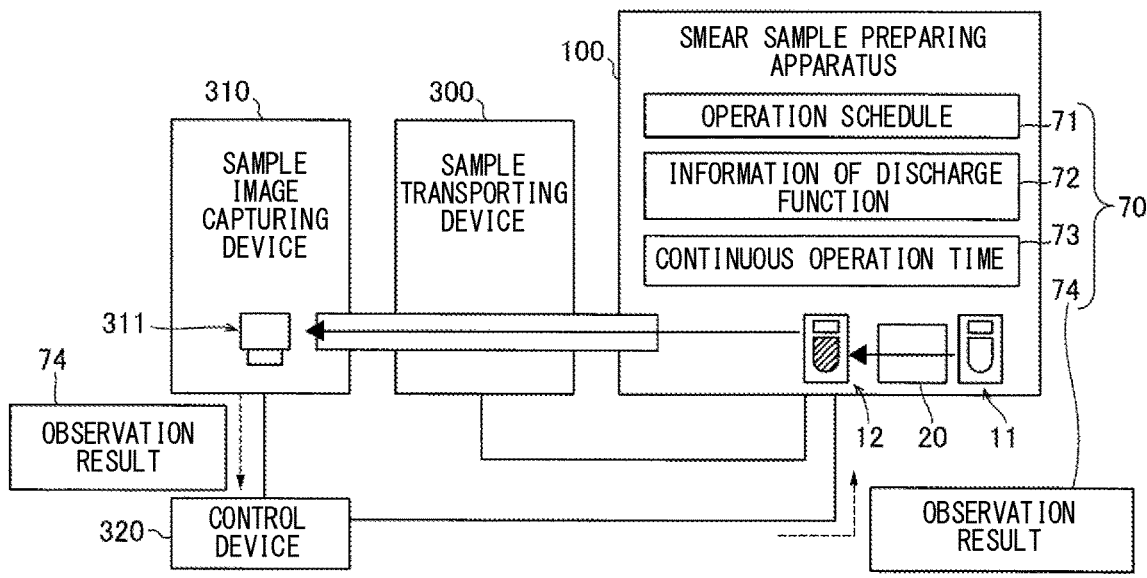
FIG. 12 is a schematic diagram showing an example of information related to the state of the smear sample preparing apparatus.

As shown in FIG. 12, the information 70 related to the state of the smear sample preparing apparatus 100 includes: information 71 related to an operation schedule of the smear sample preparing apparatus 100; information 72 related to a discharge function for the liquid in the staining bath 20; information 73 related to a continuous operation time of the smear sample preparing apparatus 100; information 74 related to an observation result of a smear sample slide 12 stained by the smear sample preparing apparatus 100; and the like.

Based on these pieces of information, the state of the smear sample preparing apparatus 100 at the time of information acquisition can be appropriately grasped, whereby a washing condition corresponding to a washing operation according to the state of the smear sample preparing apparatus 100 can be appropriately set.

The information 71 related to an operation schedule of the smear sample preparing apparatus 100 is, for example, schedule information that defines days on which the smear sample preparing apparatus 100 will be operated (i.e., weekdays), and days on which the smear sample preparing apparatus 100 will not be operated (i.e., weekends and holidays). The smear sample preparing apparatus 100 may include a storage unit for storing therein the information 71 related to the operation schedule. When the information 71 related to the operation schedule of the smear sample preparing apparatus 100 indicates that it is the day before consecutive holidays, for example, it is considered that the non-operating period of the smear sample preparing apparatus 100 will be increased and dirt will highly likely be deposited on the staining bath 20. Therefore, such deposition of dirt can be effectively inhibited by setting a washing condition for a washing operation having higher washing effect.

The information 72 related to the discharge function for the liquid in the staining bath 20 is, for example, information about a time period from start of discharge of the liquid in the staining bath 20 to end of the discharge, or information about the discharge flow rate of the liquid in the staining bath 20. It is known that the discharge function for the liquid in the staining bath 20 is degraded when the time required for discharge of the liquid from the staining bath 20 is increased or when the discharge flow rate of the liquid from the staining bath 20 is reduced. It is determined, from the degraded discharge function, that dirt due to precipitates from the staining liquid 91 is accumulated in the discharge port and/or the discharge path in the staining bath 20, and that such dirt is highly likely to be accumulated in the staining bath 20. Therefore, when the liquid discharge function is degraded as described above, accumulated dirt can be effectively removed by setting the washing condition for the washing operation having the higher washing effect.

The information 73 related to the continuous operation time of the smear sample preparing apparatus 100 is information about a time length during which the smear sample preparing apparatus 100 continues to operate from when it was activated. When the continuous operation time of the smear sample preparing apparatus 100 is longer than a normally estimated time, it is determined that dirt is highly likely to be accumulated in the staining bath 20. Therefore, accumulation of dirt can be inhibited by setting the washing condition for the washing operation having the higher washing effect.

The information 74 related to an observation result of a smear sample slide 12 stained by the smear sample preparing apparatus 100 is information about the number of artifacts detected in a microscopic image. As shown in FIG. 12, a prepared smear sample slide 12 is transported to a sample image capturing device 310 by a sample transporting device 300, for example. The sample image capturing device 310 includes an imaging unit 311 for capturing a microscopic image of the smear sample slide 12, and has a function of analyzing the captured image. In the microscopic image, not only stained cells to be observed but also precipitates and other impurities adhered to the smear sample slide 12 in the staining bath 20 during the staining process, appear. The sample image capturing device 310 counts the number of stained cells and the number of artifacts in the microscopic image, through image analysis. The sample image capturing device 310 outputs the counted number of artifacts as an observation result to a control device 320. The smear sample preparing apparatus 100 obtains the information 74 including the obtained number of artifacts via the control device 320.

When the information 74 related to the obtained observation result indicates that the number of artifacts observed on the smear sample slide 12 is great, it is suggested that precipitates in the staining bath 20 are likely to be adhered to the smear sample slide 12. That is, it can be determined that the smear sample preparing apparatus 100 is likely to be in the state where dirt is accumulated in the staining bath 20. Therefore, when the number of artifacts observed is great, accumulated dirt can be removed by selecting the washing condition for the washing operation having the higher washing effect.

As described above, since it can be determined, from the information 70 related to the state of the smear sample preparing apparatus 100, whether or not the washing operation corresponding to the washing condition having the higher washing effect is needed in the smear sample preparing apparatus 100, it is possible to set the washing condition corresponding to the appropriate washing operation. Although four pieces of information 71 to 74 are described as examples, any information may be adopted as the information 70 related to the state of the smear sample preparing apparatus 100, as long as the information allows the state of the smear sample preparing apparatus 100 to be directly or indirectly grasped.

When setting of the washing condition is performed based on the information related to the state of the smear sample preparing apparatus 100, the washing operation corresponding to the selected washing condition can be executed as is. Alternatively, the set washing condition may be presented to the user.

Figure 11B:
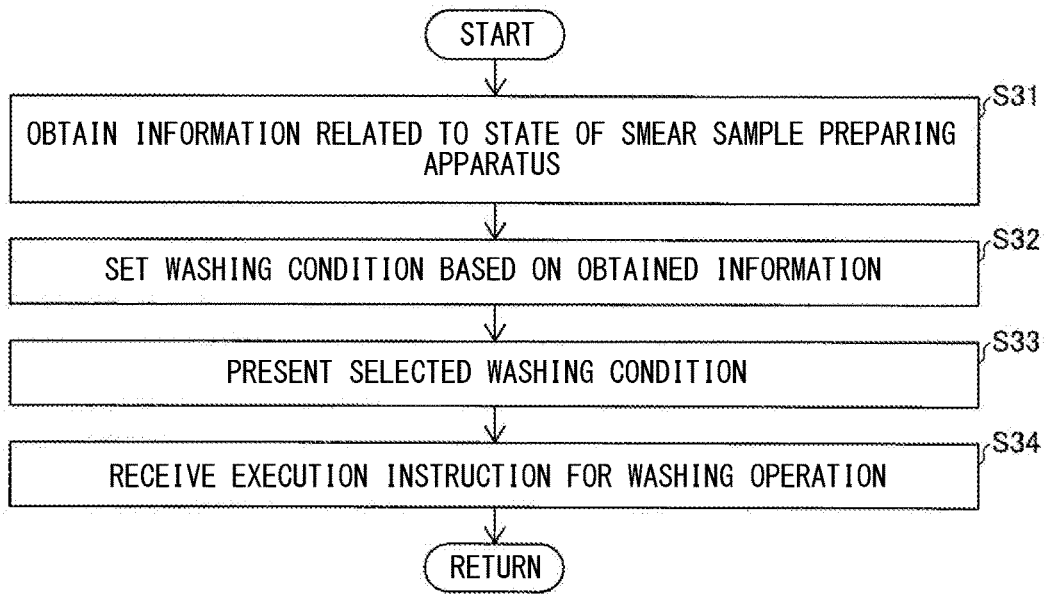
FIG. 11B is a flowchart of a third example of a washing condition setting step.

That is, as shown in FIG. 11B, the washing method for the staining bath of the smear sample preparing apparatus 100 may further include: (S33) presenting the washing condition that is set based on the obtained information; and (S34) receiving an execution instruction for the washing operation corresponding to the set washing condition.

The controller 40, in step S33, performs a process of causing the display unit 50 to display the set washing condition. The controller 40, in step S34, performs a process of causing the input unit 51 to receive an execution instruction for the washing operation corresponding to the set washing condition. Thus, when setting the washing condition, the user is allowed to input an execution instruction for the washing operation corresponding to the presented washing condition while the user checks the washing condition. This inhibits erroneous execution of a washing operation corresponding to a washing condition that is not intended by the user.

Figure 13:
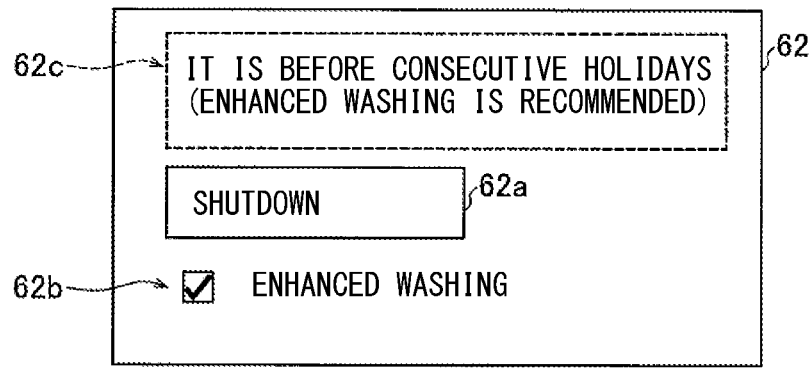
FIG. 13 shows a first example of information related to a washing condition displayed on the operation screen.

For example, FIG. 13 shows an example in which the washing condition corresponding to the second washing operation having the higher washing effect is set based on the information 71 related to an operation schedule of the smear sample preparing apparatus 100. In this case, in step S33, the controller 40 causes the display unit 50 to display an operation screen 62. On the operation screen 62, a check box 62b for enhanced washing, which is the second washing condition corresponding to the second washing operation, is in the ON state, so that the enhanced washing as the second washing condition corresponding to the second washing operation has already been set. In step S34, the controller 40 receives an input operation performed on the button 62a by the user, and executes the washing operation.

In the example shown in FIG. 13, the controller 40 causes the display unit 50 to display information related to the enhanced washing as the washing condition corresponding to the recommended washing operation, together with the washing operation. That is, an information display box 62c is provided, which displays the information related to the enhanced washing as the washing condition corresponding to the recommended washing operation. Since the information related to the enhanced washing as the washing condition corresponding to the recommended washing operation is displayed, the user can more appropriately perform setting of the washing condition corresponding to the washing operation with reference to the displayed information.

On the operation screen 62 shown in FIG. 13, it is determined, from the information 71 related to the operation schedule of the smear sample preparing apparatus 100, that it is the day before consecutive holidays. Therefore, the information display box 62c indicates that the enhanced washing as the second washing condition corresponding to the second washing operation having the higher washing effect is recommended.

Figure 14:
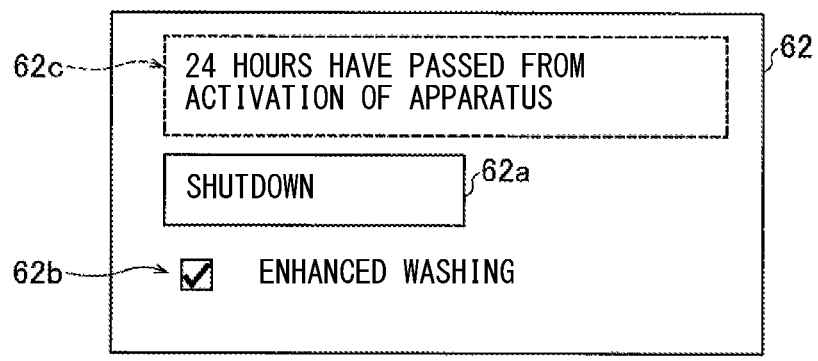
FIG. 14 shows a second example of information related to a washing condition displayed on the operation screen.

FIG. 14 shows an example in which it is determined, from the information 73 related to the continuous operation time of the smear sample preparing apparatus 100, that the continuous operation time exceeds a threshold value, and therefore, the enhanced washing as the second washing condition corresponding to the second washing operation having the higher washing effect is set. In this case, in step S33, the controller 40 causes the display unit 50 to display an operation screen 62 indicating that the washing condition corresponding to the second washing operation having the higher washing effect is set.

On the operation screen 62, the information display box 62c indicates that the continuous operation time of the smear sample preparing apparatus 100 is 24 hours.

Figure 15:
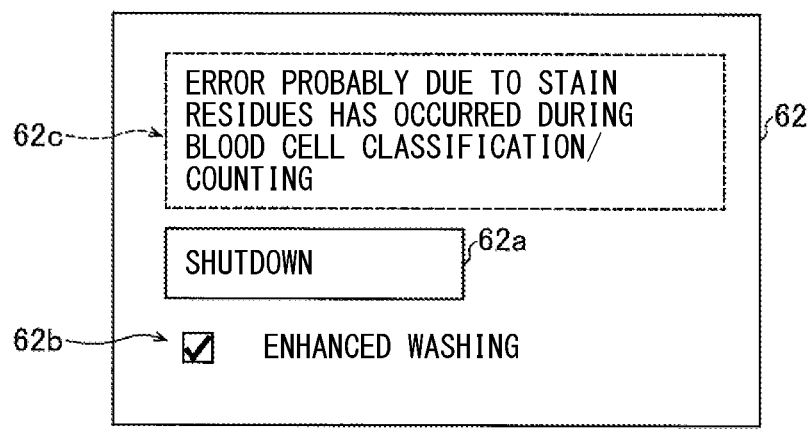
FIG. 15 shows a third example of information related to a washing condition displayed on the operation screen.

FIG. 15 shows an example in which it is determined, from the information 74 related to an observation result of the smear sample slide 12 stained by the smear sample preparing apparatus 100, that the number of artifacts exceeds a threshold value, and therefore, the enhanced washing as the second washing condition corresponding to the second washing operation having the higher washing effect is set. In this case, in step S33, the controller 40 causes the display unit 50 to display the operation screen 62 indicating that the enhanced washing as the second washing condition corresponding to the second washing operation having the higher washing effect is set.

On the operation screen 62, the information display box 62c indicates that an error (i.e., the number of artifacts exceeding the threshold value) probably due to stain residues has occurred during blood cell classification/counting.

Each of the operation screens 62 shown in FIG. 13 to FIG. 15 is a recommendation screen that receives setting of a washing condition based on the obtained information 70 related to the state of the smear sample preparing apparatus. That is, each of the examples shown in FIG. 13 to FIG. 15 includes a step of presenting the recommendation screen, and a step of receiving, as washing condition information, setting of the washing condition through the recommendation screen. The controller 40 is configured to execute: a process of obtaining the information 70 related to the state of the smear sample preparing apparatus 100, and causing the display unit 50 to display the recommendation screen that receives setting of one washing condition among the plurality of washing conditions stored in the storage unit 41, based on the obtained information 70; and a process of receiving setting of one washing condition from among the plurality of washing conditions stored in the storage unit 41 through the recommendation screen. Then, in the recommendation screen presenting step, the controller 40 presents the information 70 related to the state of the smear sample preparing apparatus. This allows the user to set an appropriate washing condition based on the information 70.

(Detailed Configuration of Smear Sample Preparing Apparatus)

Figure 16:
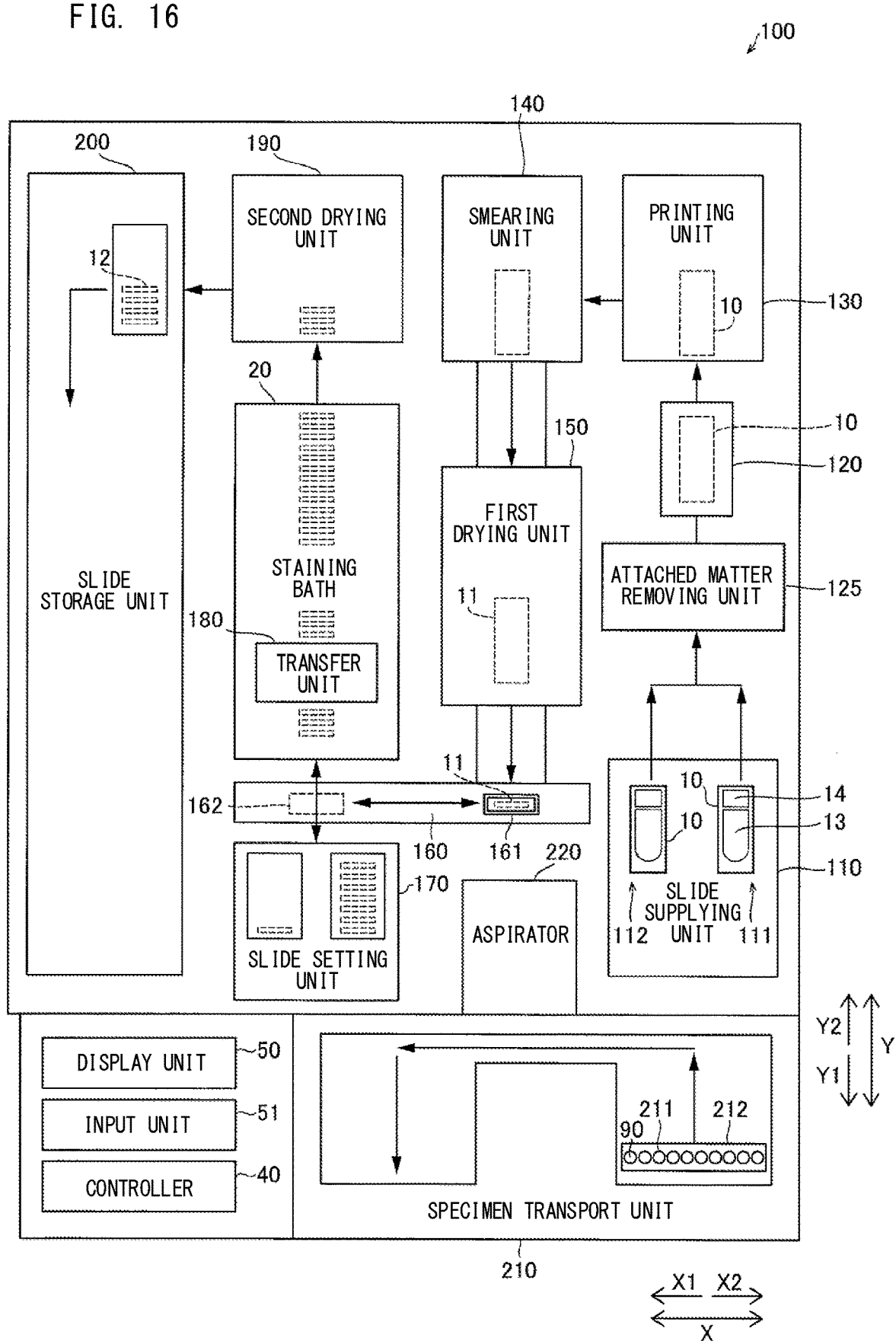
FIG. 16 is a plan view showing the outline of the smear sample preparing apparatus according to the embodiment.

Hereinafter, a preferable configuration of the smear sample preparing apparatus 100 shown in FIG. 1 will be specifically described with reference to FIG. 16 and subsequent drawings. The smear sample preparing apparatus 100 shown in FIG. 16 is configured to perform a smearing process of smearing a specimen 90 on a glass slide 10, and perform a staining process of staining the specimen 90 on a glass slide 11 having the specimen 90 smeared thereon. The specimen is blood, for example.

The smear sample preparing apparatus 100 includes a staining bath 20, a fluid circuit unit 30 (see FIG. 17), and a controller 40. The smear sample preparing apparatus 100 shown in FIG. 16 further includes a slide supplying unit 110, a transfer mechanism 120, an attached matter removing unit 125, a printing unit 130, a smearing unit 140, a first drying unit 150, and a slide transport unit 160. The smear sample preparing apparatus 100 further includes a slide setting unit 170, a transfer unit 180, a second drying unit 190, and a slide accommodation unit 200. The smear sample preparing apparatus 100 further includes an input unit 51, a display unit 50, a storage unit 41 (see FIG. 17), an input/output unit 42 (see FIG. 17), and a communication unit 43 (see FIG. 17). The smear sample preparing apparatus 100 further includes a specimen transport unit 210 and an aspirator 220.

In the following description, two directions orthogonal to each other in a plane that is parallel to the installation surface of the smear sample preparing apparatus 100 (i.e., in a horizontal plane) are defined as an X direction and a Y direction, respectively. In the example shown in FIG. 16, the smear sample preparing apparatus 100 has a quadrangular outer shape along the X direction and the Y direction in a plan view. The X direction is defined as the left-right direction of the smear sample preparing apparatus 100, and the Y direction is defined as the depth direction of the smear sample preparing apparatus 100. A Y1 direction side is the near side of the apparatus, and a Y2 direction side is the far side of the apparatus. In addition, an up-down direction orthogonal to the horizontal surface is defined as a Z direction.

A plurality of specimen containers 211 each containing the specimen 90 are set in the specimen transport unit 210, and the specimen transport unit 210 transports the specimen containers 211 set therein to a predetermined taking-in position. The specimen transport unit 210 transports a rack 212 holding a plurality of specimen containers 211, for example. The aspirator 220 aspirates the specimen from each specimen container 211 transported to the taking-in position by the specimen transport unit 210. The aspirator 220 supplies the aspirated specimen to the smearing unit 140.

In the configuration example shown in FIG. 16, the slide supplying unit 110 includes a first supplying unit 111 and a second supplying unit 112. In the slide supplying unit 110, many unused glass slides 10 having no specimen smeared thereon can be accommodated in each of the first supplying unit 111 and the second supplying unit 112. The glass slides 10 are each accommodated to be flat such that the smear surface thereof faces upward, in the first supplying unit 111 and the second supplying unit 112.

The first supplying unit 111 and the second supplying unit 112 are arranged alongside each other in the X direction. Each of the first supplying unit 111 and the second supplying unit 112 causes the glass slides 10, which are accommodated therein and not yet subjected to smearing, to move in the Y2 direction, thereby supplying the glass slides 10 one by one.

The transfer mechanism 120 can transport one glass slide 10 while the glass slide 10 is held on the upper surface thereof, for example. The transfer mechanism 120 can receive a glass slide 10 from the first supplying unit 111. The transfer mechanism 120 can receive a glass slide 10 from the second supplying unit 112. The transfer mechanism 120 is movable in the horizontal direction (XY direction). The transfer mechanism 120 can cause the held glass slide 10 to move in the up-down direction (Z direction). The transfer mechanism 120 can transport the held glass slide 10 to the processing position of each of the attached matter removing unit 125, the printing unit 130, and the smearing unit 140. The transfer mechanism 120 transports the glass slide 10 received from the slide supplying unit 110 to the attached matter removing unit 125, the printing unit 130, and the smearing unit 140 in this order. The transfer mechanism 120 may be able to hold a plurality of glass slides 10.

The attached matter removing unit 125 has a function of removing matter attached to the surface of the glass slide 10. The attached matter removing unit 125 performs an attached matter removing process on the glass slide 10 being held on the upper surface of the transfer mechanism 120. The attached matter is small foreign substances such as glass powder and dust, for example.

In the configuration example shown in FIG. 16, the printing unit 130 can print various kinds of information such as specimen information on a printing region of the glass slide 10. The printing unit 130 performs printing on the glass slide 10 being held on the upper surface of the transfer mechanism 120.

In the configuration example shown in FIG. 16, the smearing unit 140 smears a specimen on a glass slide 10 to prepare a glass slide 11. The smearing unit 140 can smear the specimen on a smearing region 13 of the glass slide 10. In addition, the smearing unit 140 smears the specimen onto the glass slide 10 being held on the upper surface of the transfer mechanism 120.

The first drying unit 150 has a function of receiving, from the smearing unit 140, the glass slide 11 having the specimen smeared thereon, and blowing air to the smearing region 13 of the glass slide 11. The first drying unit 150 can dry, by blowing air, the specimen smeared on the glass slide 11.

The slide transport unit 160 is disposed on the Y1 direction side of the first drying unit 150 and the staining bath 20 so as to extend in the X direction. The slide transport unit 160 is configured to transport the glass slide 11 in the X1 direction from the first drying unit 150 to a taking-out position 162 between the staining bath 20 and the slide setting unit 170. The slide transport unit 160 has an accommodation part 161 for accommodating the glass slide 11, and can cause the accommodation part 161 to move in the X direction. The slide transport unit 160 receives, in the accommodation part 161, the glass slide 11 being laid substantially parallel to the installation surface, brings the glass slide 11 into a state of standing substantially perpendicularly to the installation surface, and then, transports the glass slide 11 to the taking-out position 162. Therefore, at the taking-out position 162, the glass slide 11 is held with the smear surface thereof standing along the up-down direction (Z direction). The glass slide 11 transported to the taking-out position 162 is transported to the staining bath 20 or the slide setting unit 170.

The staining bath 20 is configured to stain the specimen smeared on the glass slide 11. The staining bath 20 is arranged alongside the first drying unit 150 at the X1 direction side, and is configured to receive the glass slide 11 transported from the first drying unit 150.

The staining bath 20 includes baths 21, 22, 23, 25, and 26 (see FIG. 18) in which the staining liquid is stored, and baths 24 and 27 (see FIG. 18) in which the washing liquid for the specimen is stored. In the staining bath 20, the smeared glass slide 11 is subjected to a specimen staining process and a specimen washing process in the baths 21, 22, 23, 25, and 26 and in the baths 24 and 27, respectively. The baths 21, 22, 23, 25, and 26 each can accommodate a plurality of glass slides 11.

The slide setting unit 170 is disposed at the Y1 direction side of the staining bath 20, and is configured to hold the glass slide 11 such that the glass slide 11 can be taken in and out. The slide setting unit 170 can hold a plurality of glass slides 11 on which the specimen has been smeared and the staining process is not yet performed. In addition, the slide setting unit 170 can hold the glass slides 10 on which information has been printed by the printing unit 130 and the smearing process is not yet performed.

The transfer unit 180 can transfer the glass slide 11 between the staining bath 20, the slide setting unit 170, and the taking-out position 162. The transfer unit 180 can move, in each of the X direction, the Y direction, and the Z direction, at height positions above the staining bath 20, the slide setting unit 170, and the taking-out position 162, for example. Thus, the transfer unit 180 can grip and take out the glass slide 11 disposed at each of the staining bath 20, the slide setting unit 170, and the taking-out position 162, and can transport the glass slide 11 to each of the staining bath 20, the slide setting unit 170, and the taking-out position 162. The transfer unit 180 holds and transfers one glass slide 11. That is, the transfer unit 180 takes in and out the glass slides 11 one by one to and from the staining bath 20. The controller 40 controls the transfer unit 180 so as to sequentially transfer the glass slides 11 to the staining bath 20 and take out the glass slides 11 from the staining bath 20 in the order from a glass slide 11 for which the staining time for the staining process has elapsed.

The smear sample preparing apparatus 100 can cause the transfer unit 180 to transport a glass slide 11, which has the specimen smeared thereon and is manually set in the slide setting unit 170 by the user, from the slide setting unit 170 to the staining bath 20. Thus, the smear sample preparing apparatus 100 can be operated not only in a smearing/staining mode in which the printing process, the smearing process, and the staining process are performed, but also in a smearing mode and in a staining mode. In the smearing mode, a glass slide 11 having been subjected to the printing process and the smearing process in the printing unit 130 and the smearing unit 140 is sent to the slide setting unit 170 without being subjected to the staining process. In the staining mode, a glass slide 11 which has the specimen smeared thereon and is manually set in the slide setting unit 170 by the user, is subjected to the staining process in the staining bath 20 and is sent to the slide accommodation unit 200.

The second drying unit 190 is arranged alongside the staining bath 20, at the Y2 direction side. The second drying unit 190 receives a smear sample slide 12 which is a glass slide 11 having been subjected to the staining process in the staining bath 20. The second drying unit 190 has a function of drying, by blowing air, for example, the smear sample slide 12 having been stained in the staining bath 20. The second drying unit 190 transfers the dried smear sample slide 12 to the slide accommodation unit 200.

The slide accommodation unit 200 has a function of receiving the smear sample slide 12 for which the processes have been completed, and accommodating the smear sample slide 12. The slide accommodation unit 200 is arranged alongside the second drying unit 190, at the X1 direction side, and receives a glass slide 10 transported from the second drying unit 190.

The controller 40 controls the operations of the respective components of the smear sample preparing apparatus 100. The controller 40 is a computer including a processor such as a CPU, and volatile and/or nonvolatile memories. The computer functions as a controller of the smear sample preparing apparatus 100 when the processor executes a program stored in the memory. The processor may be an FPGA (Field-Programmable Gate Array) or the like designed to execute the function of the controller 40.

With the above configuration, the smear sample preparing apparatus 100 can automatically prepare a smear sample slide 12 by subjecting a glass slide 10 to the printing process, the specimen smearing process, and the staining process.

(Control Block)

Figure 17:
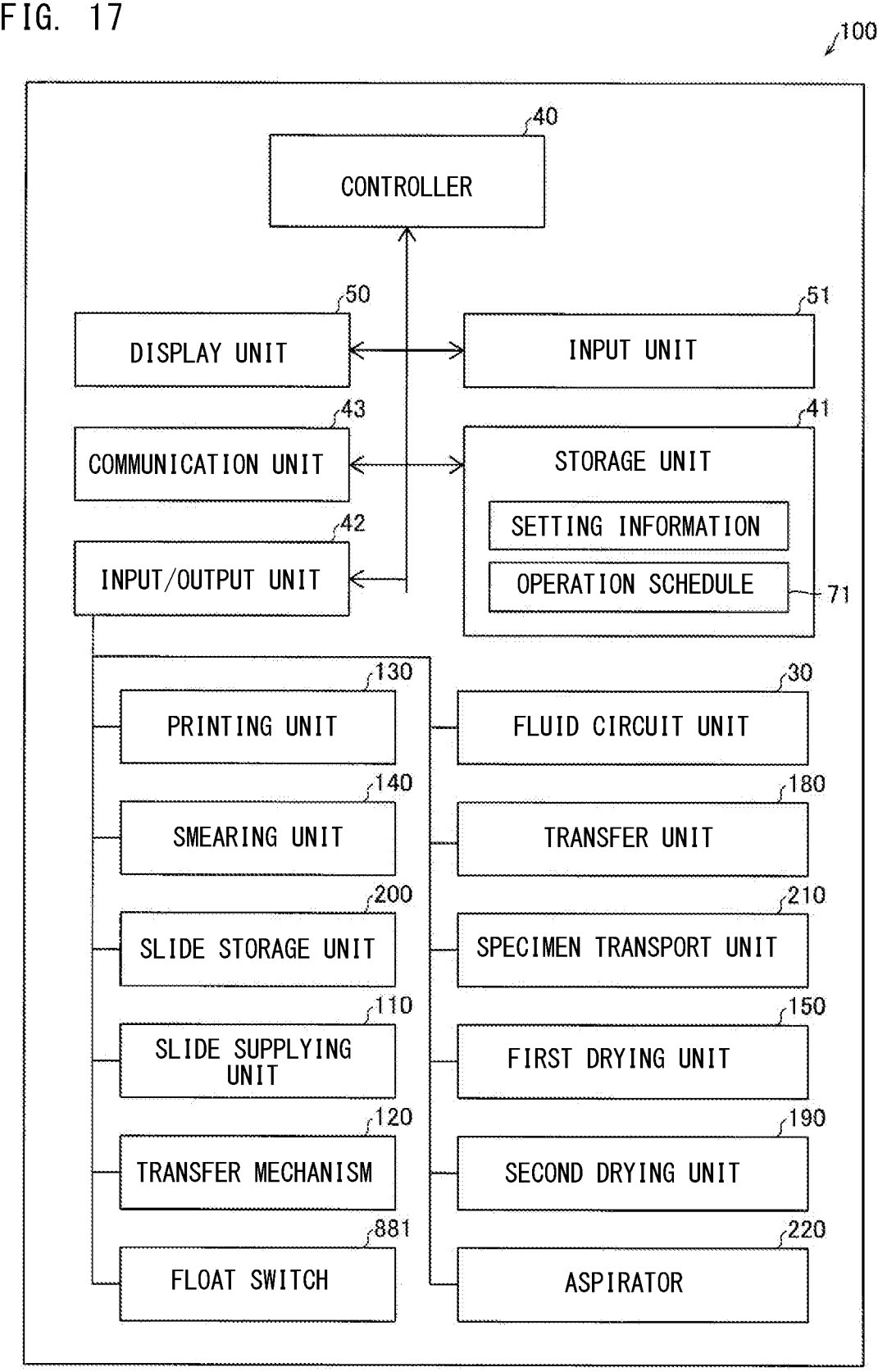
FIG. 17 is a block diagram showing relationships between a controller and components of the smear sample preparing apparatus.

As shown in FIG. 17, the controller 40 is electrically connected to the display unit 50, the input unit 51, the storage unit 41, the input/output unit 42, and the communication unit 43. The controller 40 controls the respective mechanisms included in the smear sample preparing apparatus 100 through the input/output unit 42, based on the program and setting information stored in the storage unit 41.

The input/output unit 42 includes an I/O interface which performs input/output of signals between the controller 40 and the respective mechanisms included in the smear sample preparing apparatus 100. The controller 40 is connected, through the input/output unit 42, to the respective units such as the printing unit 130, the smearing unit 140, the slide accommodation unit 200, the slide supplying unit 110, the transfer mechanism 120, the fluid circuit unit 30, the transfer unit 180, the specimen transport unit 210, the first drying unit 150, the second drying unit 190, and the aspirator 220. The controller 40 controls the supply operation and the discharge operation for the staining liquid and the washing liquid by the fluid circuit unit 30, through the input/output unit 42. The controller 40 controls the transfer operation for the glass slides 11 by the transfer unit 180, through the input/output unit 42.

The communication unit 43 includes a communication module that can communicate with external devices wirelessly or via wires. The communication unit 43 mutually communicates with the sample transporting device 300 shown in FIG. 12, for example. Through the communication, control for transferring a smear sample slide 12 prepared by the smear sample preparing apparatus 100 is performed. The communication unit 43 mutually communicates with the control device 320 shown in FIG. 12. Through the communication, the information 74 related to the observation result of the smear sample slide 12 is obtained.

The storage unit 41 stores therein setting information that associates a plurality of washing conditions of the smear sample preparing apparatus 100 with the contents of washing operations corresponding to the respective washing conditions. Executing the program thus stored functions as a washing method for the staining bath 20 of the smear sample preparing apparatus 100 shown in FIG. 2. The storage unit 41 stores therein the information 71 related to an operation schedule of the smear sample preparing apparatus 100. The information 71 related to the operation schedule of the smear sample preparing apparatus 100 can be directly inputted by the user through the input unit 51, and can be obtained from the control device 320 shown in FIG. 12 through communication, for example. The controller 40 obtains the information 71 related to the operation schedule of the smear sample preparing apparatus 100 from the storage unit 41.

The controller 40 has a clocking function, and measures a continuous operation time from when the smear sample preparing apparatus 100 was activated. Thus, the controller 40 obtains the information 73 related to the continuous operation time of the smear sample preparing apparatus 100. The controller 40 obtains a signal from a float switch 881 described later, through the input/output unit 42. The controller 40 obtains the information 72 related to the discharge function for the liquid in the staining bath 20, based on the signal from the float switch 881.

(Detailed Descriptions of Staining Unit and Transfer Unit)

Figure 18:
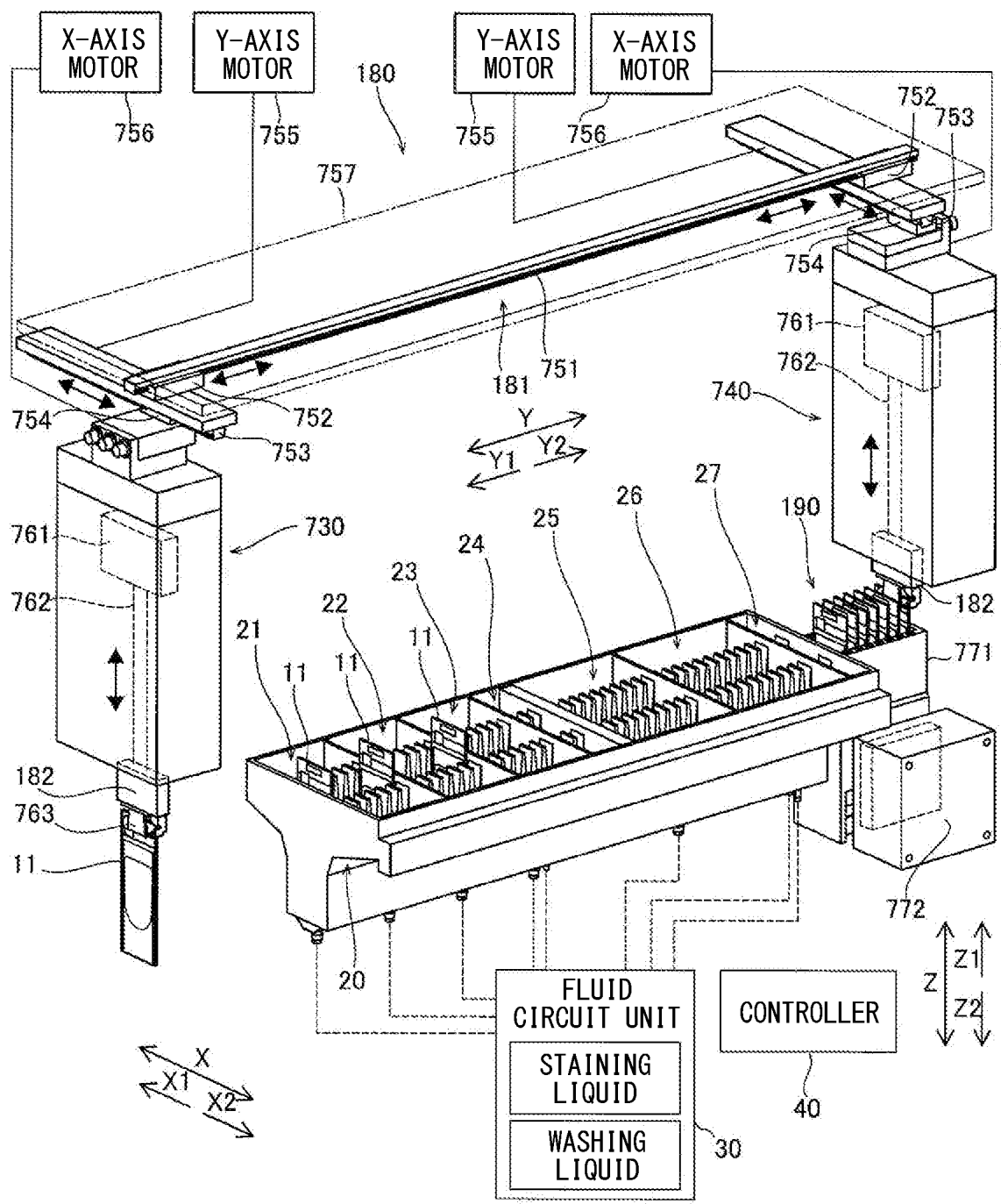
FIG. 18 is a perspective view illustrating a structure of a staining part of the smear sample preparing apparatus.

With reference to FIG. 18, the configurations of the staining bath 20 and the transfer unit 180 will be described. In the following description, the up-down direction is referred to as the Z direction.

The staining bath 20 includes the baths 21, 22, 23, 25, and 26 in which the staining liquid is stored, and the baths 24 and 27 in which the washing liquid for the specimen is stored. In the example shown in FIG. 18, the staining bath 20 integrally includes these baths 21 to 27. The fluid circuit unit 30 supplies and discharges the staining liquid and the washing liquid for the specimen to and from the baths 21, 22, 23, 25, and 26 and the baths 24 and 27, respectively. In the following description, the washing liquid for the specimen used in the staining process is referred to as "specimen washing liquid" to be distinguished from the washing liquid 81 used in the washing operation for the staining bath 20.

Each of the baths 21, 22, 23, 25, and 26 and the baths 24 and 27 has a container shape being open at the upper side, and can store therein the staining liquid and the specimen washing liquid. In each of the baths 21, 22, 23, 25, and 26 and the baths 24 and 27, a glass slide 11 whose width direction is in the X direction and whose thickness direction is in the Y direction can be inserted.

In the staining bath 20, the bath 21, the bath 22, the bath 23, the bath 24, the bath 25, the bath 26, and the bath 27 are sequentially arranged in the Y2 direction.

Inside the baths 21, 22, 23, 25, and 26, a plurality of plate-shaped holders are arranged at equal intervals in the Y direction. One glass slide 11 is inserted in a space between the holders. Both end portions in the width direction of the inserted glass slide 11 are supported by the holders, whereby the glass slide 11 is maintained in a standing state. Also, in the baths 24 and 27, the glass slide 11 can be held in a standing state.

The glass slide 11 is sequentially transported from the bath 21 to the subsequent baths, and is processed by being immersed for a predetermined set time in the staining liquid or the specimen washing liquid stored in each bath.

The transfer unit 180 is disposed above (Z1 direction) the staining bath 20 and the slide setting unit 170 (see FIG. 16). The transfer unit 180 preferably includes a first transfer unit 730 and a second transfer unit 740. Since the second transfer unit 740 is provided separately from the first transfer unit 730, transport of the glass slide 11 from the taking-out position 162 (see FIG. 16) to the staining bath 20 and transport of the smear sample slide 12 to the slide accommodation unit 200 (see FIG. 16) can be performed separately, thereby improving the transport efficiency. Each of the first transfer unit 730 and the second transfer unit 740 can be moved in the horizontal direction (i.e., the X direction and the Y direction) by a movement mechanism 181.

The movement mechanism 181 includes: a Y-axis rail 751 and a Y-axis slider 752 which extend in the Y direction; an X-axis rail 753 and an X-axis slider 754 which extend in the X direction; and a Y-axis motor 755 and an X-axis motor 756. As each of the Y-axis motor 755 and the X-axis motor 756, a stepping motor or a servo motor can be adopted, for example.

The Y-axis rail 751 is fixed to the lower surface of a support member 757. The support member 757 is a ceiling part of the housing of the smear sample preparing apparatus 100, a support beam member, or the like. The Y-axis slider 752 is mounted at the lower surface side (Z2 direction side) of the Y-axis rail 751, and can move along the Y-axis rail 751. The Y-axis motor 755 moves the Y-axis slider 752 in the Y direction through a transmission mechanism. As the transmission mechanism, a belt-pulley mechanism, a rack-pinion mechanism, or the like can be adopted, for example.

The X-axis rail 753 is fixed to the lower surface of the Y-axis slider 752. The X-axis slider 754 is mounted at the lower surface side (Z2 direction side) of the X-axis rail 753, and can move along the X-axis rail 753. The X-axis motor 756 moves the X-axis slider 754 in the X direction through a transmission mechanism.

The Y-axis slider 752, the X-axis rail 753, the X-axis slider 754, the X-axis motor 756, and the Y-axis motor 755 are each provided in a pair. The first transfer unit 730 is mounted at the lower surface side of one of the X-axis sliders 754, and the second transfer unit 740 is mounted at the lower surface side of the other X-axis slider 754. Thus, the first transfer unit 730 and the second transfer unit 740 can move in the X direction independently of each other along the individual X-axis rails 753. In addition, the first transfer unit 730 and the second transfer unit 740 can move in the Y direction independently of each other along the common Y-axis rail 751.

The first transfer unit 730 and the second transfer unit 740 have the same configuration. Each of the first transfer unit 730 and the second transfer unit 740 includes a hand 182, a Z-axis motor 761 for raising and lowering the hand 182, and a transmission mechanism 762. The Z-axis motor 761 causes the hand 182 to be raised and lowered through the transmission mechanism 762. As the transmission mechanism 762, a belt-pulley mechanism, a rack-pinion mechanism, or the like can be adopted, for example.

The hand 182 can grip one glass slide 11. FIG. 18 shows a configuration example in which the glass slide 11 is gripped in the thickness direction thereof by a pair of gripping plates 763. The pair of gripping plates 763 sandwiches the glass slide 11 while coming into contact with the surface and the back surface of the glass slide 11. The pair of gripping plates 763 can move relative to each other in the thickness direction (Y direction) of the glass slide 11. Movement of the gripping plates 763 can be realized by use of an actuator such as an air cylinder, a motor, or a solenoid, for example. The hand 182 may be configured to sandwich the glass slide 11 in the width direction.

The first transfer unit 730 can move to positions above the bath 21, the bath 22, the bath 23, and the bath 24. Therefore, the first transfer unit 730 can insert and pull out the glass slides 11 one by one into and from each of the bath 21, the bath 22, the bath 23, and the bath 24.

The first transfer unit 730 can also move to positions above the taking-out position 162 and the slide setting unit 170. Therefore, the first transfer unit 730 can take out one glass slide 11 from the taking-out position 162 (see FIG. 16), and also can insert and pull out the glass slides 11 one by one into and from the slide setting unit 170 (see FIG. 16).

The second transfer unit 740 can move to positions above the bath 24, the bath 25, the bath 26, and the bath 27. Therefore, the second transfer unit 740 can insert and pull out the glass slides 11 one by one into and from each of the bath 24, the bath 25, the bath 26, and the bath 27.

The second transfer unit 740 can move to positions above the second drying unit 190 and the slide accommodation unit 200 (see FIG. 16). Therefore, the second transfer unit 740 can insert and pull out the smear sample slides 12 one by one into and from the second drying unit 190, and also can insert the smear sample slides 12 one by one into the slide accommodation unit 200 (see FIG. 16).

The first transfer unit 730 and the second transfer unit 740 can respectively transport the glass slides 11 or the smear sample slides 12 in parallel with each other. The operation range of the first transfer unit 730 and the operation range of the second transfer unit 740 overlap each other at the bath 24, and the glass slide 11 is delivered at the bath 24. The delivery position may be a position other than the bath 24.

The second drying unit 190 includes an accommodation unit 771 and an air-blowing unit 772. The accommodation unit 771 is a container open at the upper side, and can accommodate a plurality of smear sample slides 12 each in a standing state. The air-blowing unit 772 can blow air into the accommodation unit 771. By the air-blowing unit 772 blowing air, the stained smear sample slide 12 accommodated in the accommodation unit 771 are dried.

(Fluid Circuit Unit)

Figure 19:
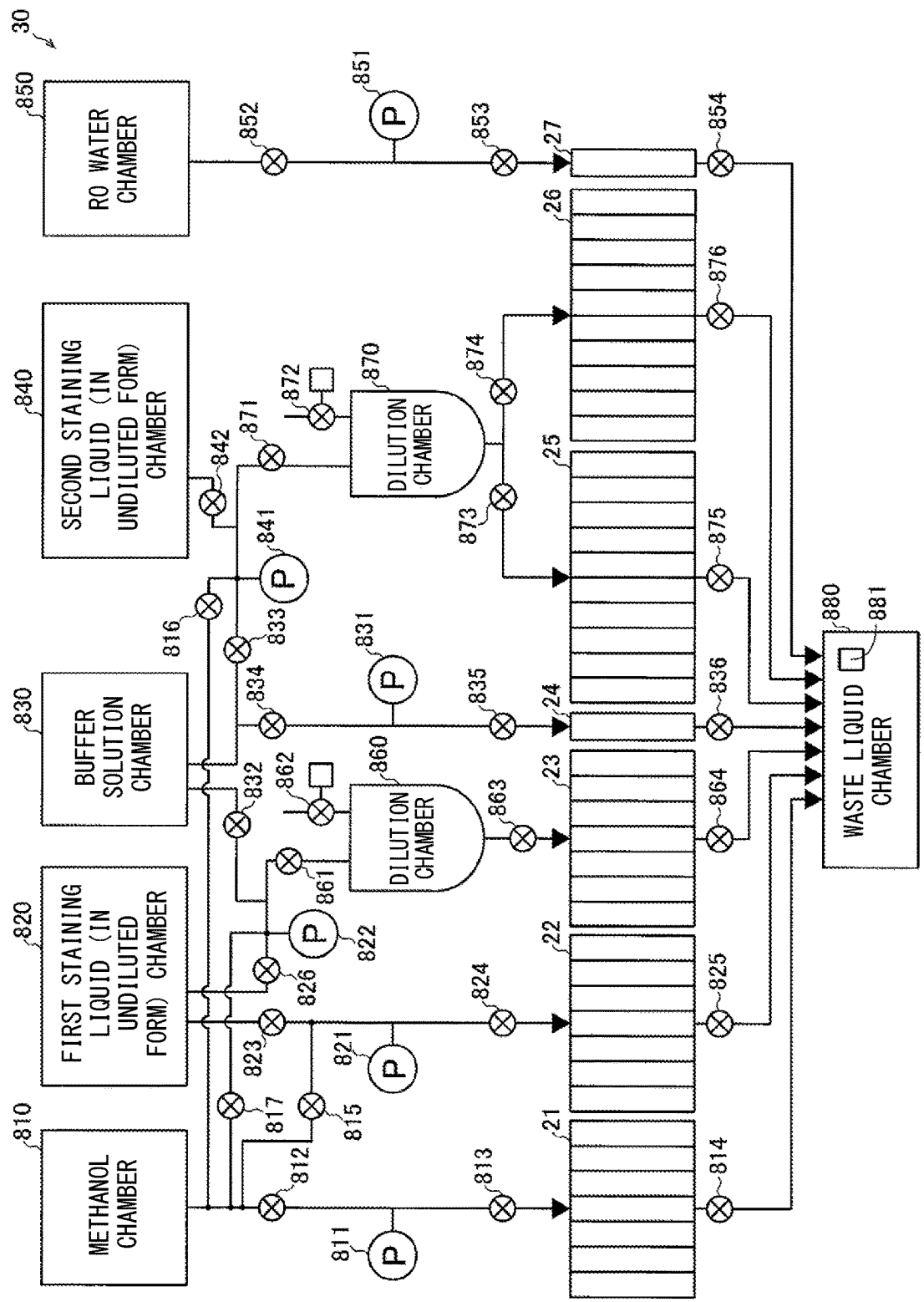
FIG. 19 shows a structure of a fluid circuit unit of the smear sample preparing apparatus.

FIG. 19 schematically shows the fluid circuit unit 30.

The fluid circuit unit 30 includes chambers 810, 820, 830, 840, and 850 each storing therein liquids to be used for preparation of a smear sample slide 12. The fluid circuit unit 30 further includes a dilution chamber 860 and a dilution chamber 870. The fluid circuit unit 30 includes pumps 811, 821, 822, 831, 841, and 851. The fluid circuit unit 30 includes valves 812, 813, 814, 815, 816, 817, 823, 824, 825, 826, 832, 833, 834, 835, 836, 842, 852, 853, 854, 861, 862, 863, 864, 871, 872, 873, 874, 875, and 876. Each chamber is a liquid container formed to be capable of storing a predetermined amount of liquid therein. Each pump is a quantitative pump such as a diaphragm pump or a syringe pump, and is a diaphragm pump, for example. Each valve is a valve at least capable of switching a flow path between an open state and a closed state, and is an ON/OFF valve, for example.

Methanol is stored in the chamber 810. A first staining liquid in undiluted form is stored in the chamber 820. A buffer is stored in the chamber 830. A second staining liquid in undiluted form is stored in the chamber 840. RO (Reverse Osmosis) water is stored in the chamber 850. The first staining liquid is selected from between May-Grunwald staining liquid and wright staining liquid, for example. The second staining liquid is selected from between Giemsa staining liquid and wright staining liquid, for example.

Each staining liquid is quantified by the pumps 811, 821, 822, 841 and is supplied to the bath 21, 22, 23, 25, 26. In the case where the staining liquid is supplied as a diluted staining liquid, the staining liquid in undiluted form and a diluent are supplied to the dilution chamber 860 or the dilution chamber 870, and the staining liquid is diluted to a predetermined concentration. The specimen washing liquid is quantified by the pumps 831, 851 to be supplied to the baths 24, 27.

The fluid circuit unit 30 supplies methanol stored in the chamber 810 to the bath 21 in accordance with opening/closing of the valves 812, 813 and operation of the pump 811. The fluid circuit unit 30 supplies the first staining liquid in undiluted form stored in the chamber 820 to the bath 22 in accordance with opening/closing of the valve 823 and operation of the pump 821. The fluid circuit unit 30 supplies the first staining liquid in undiluted form stored in the chamber 820 and the buffer stored in the chamber 830, to the dilution chamber 860, in accordance with opening/closing of the valves 826, 832, 861 and operation of the pump 822. In the dilution chamber 860, the diluted first staining liquid is quantified. The fluid circuit unit 30 supplies positive pressure from a positive pressure source to the dilution chamber 860 by switching the valve 862, and supplies the diluted first staining liquid stored in the dilution chamber 860 to the bath 23 by opening/closing the valve 863. The fluid circuit unit 30 supplies the buffer stored in the chamber 830 to the bath 24 in accordance with opening/closing of the valves 834, 835 and operation of the pump 831. The buffer (phosphate buffer) is used as both a diluent for the staining liquid and a specimen washing liquid.

The fluid circuit unit 30 supplies the second staining liquid in undiluted form stored in the chamber 840 and the buffer stored in the chamber 830, to the dilution chamber 870, in accordance with opening/closing of the valves 833, 842, 871 and operation of the pump 841. In the dilution chamber 870, the diluted second staining liquid is quantified. The fluid circuit unit 30 supplies positive pressure from the positive pressure source to the dilution chamber 870 by switching the valve 872, and supplies the diluted second staining liquid stored in the dilution chamber 870 to the bath 25 or to both the bath 25 and the bath 26 by opening/closing the valves 873, 874. The fluid circuit unit 30 supplies the RO water (pure water) stored in the chamber 850 to the bath 27 in accordance with opening/closing of the valves 852, 853 and operation of the pump 851.

The fluid circuit unit 30 discharges the liquid stored in the bath 21, into the waste liquid chamber 880 in accordance with opening/closing the valve 814. The fluid circuit unit 30 discharges the liquid stored in the bath 22, into the waste liquid chamber 880 in accordance with opening/closing of the valve 825. The fluid circuit unit 30 discharges the liquid stored in the bath 23, into the waste liquid chamber 880 in accordance with opening/closing of the valve 864. The fluid circuit unit 30 discharges the liquid stored in the bath 24, into the waste liquid chamber 880 in accordance with opening/closing of the valve 836. The fluid circuit unit 30 discharges the liquid stored in the bath 25, into the waste liquid chamber 880 in accordance with opening/closing of the valve 875. The fluid circuit unit 30 discharges the liquid stored in the bath 26, into the waste liquid chamber 880 in accordance with opening/closing of the valve 876. The fluid circuit unit 30 discharges the liquid stored in the bath 27, into the waste liquid chamber 880 in accordance with opening/closing of the valve 854.

The waste liquid chamber 880 is provided with a float switch 881 for detecting the amount of liquid received in the waste liquid chamber 880. Based on an output signal from the float switch 881, the controller 40 detects that all the liquid stored in any bath has been discharged into the waste liquid chamber 880. The controller 40 measures a time period required from when liquid discharge is started by opening any of the valve 825, the valve 864, the valve 836, the valve 875, and the valve 876, to when completion of the liquid discharge is detected by the float switch 881. Thus, the controller 40 obtains the information 72 related to the discharge function for the liquid in the staining bath 20.

<Washing Operation>

The fluid circuit unit 30 is configured to be able to supply the washing liquid 81 for washing baths, to each of the plurality of baths 22, 23, 24, 25, 26, and 27 of the staining bath 20. The fluid circuit unit 30 can supply the bath washing liquid 81 to each of the baths 22, 23, 24, 25, 26, and 27 at shutdown of the smear sample preparing apparatus 100, for example. Since no staining liquid is mixed in the bath 21 and the bath 21 need not be washed, the washing liquid 81 is not supplied to the bath 21. In the configuration example shown in FIG. 19, the washing liquid 81 is methanol stored in the chamber 810. That is, methanol used in the staining process is used as the washing liquid 81 when the staining bath 20 is washed.

The fluid circuit unit 30 supplies the washing liquid 81 in undiluted form to the bath 22 and the bath 24. The fluid circuit unit 30 supplies methanol stored in the chamber 810 to the bath 22 in accordance with opening/closing of the valves 815, 824 and operation of the pump 821. The fluid circuit unit 30 supplies methanol stored in the chamber 810 to the bath 24 in accordance with opening/closing of the valves 816, 833, 834, 835 and operation of the pump 831.

The fluid circuit unit 30 supplies the diluted washing liquid, which is obtained by diluting the washing liquid 81 in undiluted form, to the bath 23, the bath 25, and the bath 26. The diluent is the buffer (phosphate buffer) stored in the chamber 830. That is, the buffer used for the staining process is used as a diluent for the washing liquid 81 in undiluted form when the staining bath 20 is washed.

The fluid circuit unit 30 supplies the washing liquid 81 in the undiluted form stored in the chamber 810 and the diluent stored in the chamber 830, to the dilution chamber 860, in accordance with opening/closing of the valves 817, 832, 861 and operation of the pump 822. In the dilution chamber 860, the washing liquid 81 in undiluted form is diluted by the diluent, thereby preparing the diluted washing liquid. The fluid circuit unit 30 supplies positive pressure from the positive pressure source to the dilution chamber 860 by switching the valve 862, and supplies the diluted washing liquid stored in the dilution chamber 860 to the bath 23 by opening/closing the valve 863.

The fluid circuit unit 30 supplies the washing liquid 81 in undiluted form stored in the chamber 810 and the diluent stored in the chamber 830, to the dilution chamber 870, in accordance with opening/closing of the valves 816, 833, 871 and operation of the pump 841. In the dilution chamber 870, the washing liquid 81 in undiluted form is diluted by the diluent, thereby preparing the diluted washing liquid. The fluid circuit unit 30 supplies positive pressure from the positive pressure source to the dilution chamber 870 by switching the valve 872, and supplies the diluted washing liquid stored in the dilution chamber 870 to the baths 25 and 26 by opening and closing the valves 873, 874.

The concentration of the diluted washing liquid depends on a ratio of the number of times of operation of the pumps. That is, the concentration K can be expressed by the following equation (1) based on the number N of times of discharge of the washing liquid 81 in undiluted form and on the number M of times of discharge of the diluent. When the controller 40 controls the number N of times of discharge and the number M of times of discharge, based on the set concentration, the diluted washing liquid of a desired concentration is prepared.

$$K = N/(N+M) \qquad (1)$$

The amount of the diluted staining liquid to be quantified in the dilution chamber 860, 870 is a fixed value that depends on the volume of each bath. Therefore, assuming that the total number of times of discharge of the pumps is Q, the following equation (2) is established.

$$N+M = Q \text{ (constant value)} \qquad (2)$$

Since the value of Q is known, the number N of times of discharge and the number M of times of discharge are obtained when the concentration K is determined.

As described above, the fluid circuit unit 30 includes the chamber 810 in which the washing liquid 81 in undiluted form is stored, the chamber 830 in which the diluent is stored, and the dilution chambers 860 and 870 in which the washing liquid 81 in undiluted form and the diluent are mixed. The controller 40 controls the fluid circuit unit 30 so as to prepare, in the dilution chamber 860 and the dilution chamber 870, the washing liquid 81 having the concentration according to the selected washing operation. In this case, step S2 of executing the washing operation shown in FIG. 2 includes a step of preparing a washing liquid (i.e., a diluted washing liquid) at a mixing ratio of the washing liquid 81 in undiluted form to the diluent according to the washing condition.

Since the washing liquid 81 having an appropriate concentration can be prepared, a washing operation corresponding to a washing condition that provides an optimum washing effect can be executed by use of the washing liquid 81 having the appropriate concentration. In addition, since it is not necessary to separately prepare a plurality of types of washing liquids 81 having different concentrations, the storage space for the washing liquid 81 in the smear sample preparing apparatus 100 can be reduced, and the configuration of the fluid circuit unit 30 can be simplified.

The washing liquid 81 used for washing the bath 27 is RO water. At the time of washing, the fluid circuit unit 30 supplies the RO water (pure water) stored in the chamber 850 to the bath 27 in accordance with opening/closing of the valves 852, 853 and operation of the pump 851.

(Smear Sample Preparing Process)

Figure 20:
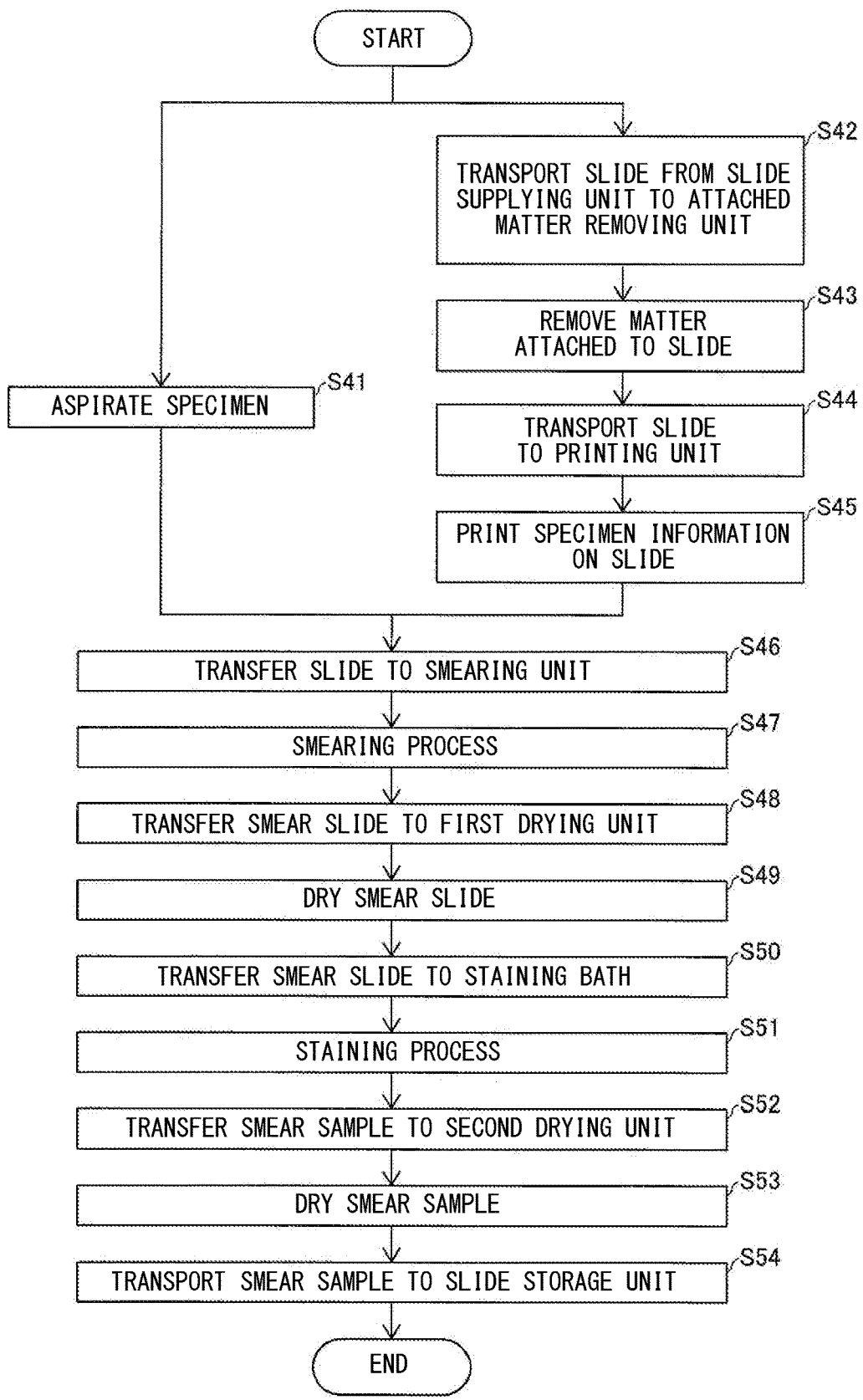
FIG. 20 is a flowchart of a smear sample preparing process by the smear sample preparing apparatus.

A smear sample preparing process performed by the controller 40 of the smear sample preparing apparatus 100 will be described with reference to FIG. 20. While the smear sample preparing apparatus 100 shown in FIG. 16 is operable in a plurality of modes such as a staining mode performing only a staining process, a smearing mode performing only a printing process and a smearing process, and a smearing/staining mode performing the printing process, the smearing process, and the staining process, here, an example of an operation in the smearing/staining mode will be described as one example.

When starting sample preparation, a user sets the rack 212 accommodating the specimen containers 211 on the specimen transport unit 210, and presses a start button to instruct start of the smearing/staining mode. Upon receiving the instruction to start the smearing/staining mode, the controller 40 starts the operation in the smearing/staining mode.

In step S41, the controller 40 controls the specimen transport unit 210 and the aspirator 220 so as to aspirate the specimen from the specimen containers 211 set in the specimen transport unit 210 by the user.

The controller 40 controls the specimen transport unit 210 so that one specimen container 211 held in the rack 212 on the specimen transport unit 210 is located at the taking-in position. The controller 40 controls the aspirator 220 so as to aspirate the specimen in the specimen container 211 transported to the taking-in position. The specimen aspirated by the aspirator 220 is sent to the smearing unit 140.

In parallel with the process in step S41, the controller 40 executes processes in steps S42 to S45. In step S42, the controller 40 controls the slide supplying unit 110 so as to send an unused glass slide 10 from the slide supplying unit 110 onto the transfer mechanism 120. Then, the controller 40 controls the transfer mechanism 120 holding the glass slide 10 so as to move to the attached matter removing unit 125.

In step S43, the controller 40 operates the attached matter removing unit 125 so as to remove attached matter at the surface of the glass slide 10. In step S44, the controller 40 controls the transfer mechanism 120 holding the glass slide 10 so as to move to the printing unit 130. In step S45, the controller 40 controls the printing unit 130 so as to execute the printing process of printing specimen information on the printing region 14 of the glass slide 10.

Next, in step S46, the controller 40 controls the transfer mechanism 120 holding the glass slide 10 so as to move to the smearing unit 140. In step S47, the controller 40 controls the smearing unit 140 so as to execute the smearing process of smearing the specimen on the smearing region 13 of the glass slide 10. Thus, a glass slide 11 having the specimen smeared thereon is prepared.

Next, in step S48, the controller 40 performs control so as to transport the glass slide 11 having been subjected to printing and smearing, from the smearing unit 140 to the first drying unit 150. In step S49, the controller 40 controls the first drying unit 150 so as to blow air to the smearing region 13 of the glass slide 11 and dry the specimen.

Next, in step S50, the controller 40 performs control to transport the glass slide 11 having been subjected to the printing process, the smearing process, and the drying process, to the staining bath 20. Specifically, the controller 40 performs control so as to transfer the glass slide 11 having been subjected to the drying process, from the first drying unit 150 to the slide transport unit 160. The controller 40 controls the slide transport unit 160 so as to transport the glass slide 11 to the taking-out position 162. When the glass slide 11 has arrived at the taking-out position 162, the controller 40 controls the first transfer unit 730 of the transfer unit 180 so as to grip the glass slide 11 at the taking-out position 162, take out the glass slide 11 from the slide transport unit 160, and transfer the glass slide 11 to the staining bath 20. Thus, the glass slide 11 is transferred to the staining bath 20.

In step S51, the controller 40 controls the transfer unit 180 and the fluid circuit unit 30 so as to execute the staining process in the staining bath 20. Thus, a smear sample slide 12 is prepared.

In step S52, the controller 40 controls the second transfer unit 740 of the transfer unit 180 so as to transfer the smear sample slide 12, which is the glass slide 11 having been subjected to the staining process, from the staining bath 20 to the second drying unit 190. In step S53, the controller 40 controls the second drying unit 190 so as to execute the process of blowing air to the smear sample slide 12 to dry the smear sample slide 12.

In step S54, the controller 40 controls the second transfer unit 740 and the slide accommodation unit 200 so as to transfer the dried smear sample slide 12 from the second drying unit 190 to the slide accommodation unit 200.

Thus, the unused glass slide 10 is sequentially subjected to the printing process, the smearing process, and the staining process, and the smear sample slide 12 prepared is stored in the slide accommodation unit 200. The controller 40 repeats the process in the aforementioned smearing/staining mode so that the printing process, the smearing process, and the staining process are sequentially executed on the unused glass slides 10 by use of the specimens sequentially aspirated from the plurality of specimen containers 211 held in the rack 212. Therefore, the staining process in the staining bath 20 is sequentially executed on the glass slides 11 transferred by the transfer unit 180, one by one, at predetermined time intervals according to the operation cycle of the smear sample preparing apparatus 100.

(Shutdown Process)

Next, a shutdown process of the smear sample preparing apparatus 100 will be described with reference to FIG. 21. The washing operation for the staining bath 20 according to the present embodiment is performed as a part of the shutdown process. As for the respective components of the smear sample preparing apparatus 100, FIG. 16 to FIG. 19 will be referred to.

A user inputs a shutdown process start instruction through the input unit 51. Thus, the controller 40 receives the shutdown process start instruction, and starts the shutdown process. In addition, the user can set a container in which an agent for the shutdown process is stored, at the rear end of the rack 212 holding the specimen containers 211. In this case, the controller 40 controls the respective components so that the shutdown process is automatically started when the aspirator 220 aspirates the agent for the shutdown process after preparation of smear samples for all specimens has been executed.

Figure 21:
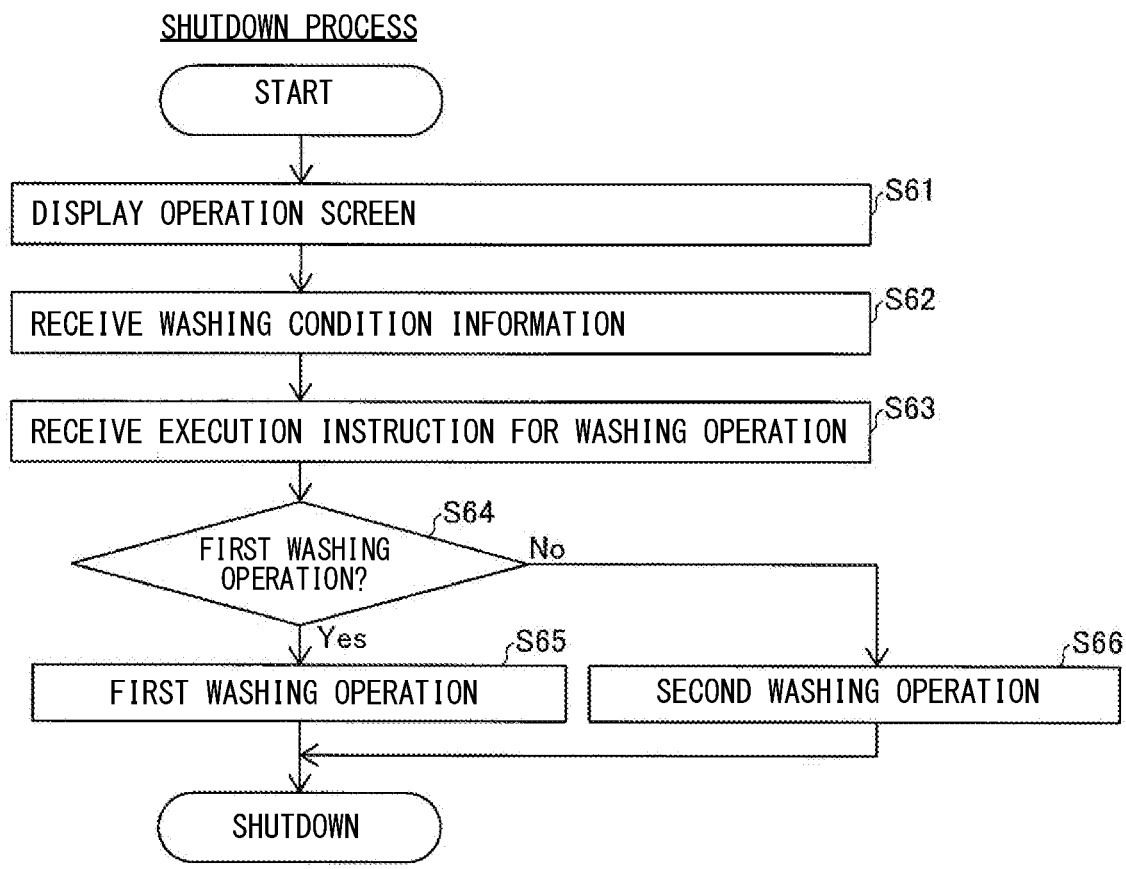
FIG. 21 is a flowchart of a shutdown process for the smear sample preparing apparatus.

In step S61 in FIG. 21, the controller 40 causes the display unit 50 to display an operation screen. On the operation screen, the controller 40 presents a washing condition corresponding to a washing operation in a settable manner. For example, the operation screen 62 shown in FIG. 9 and FIG. 10 will be described. The operation screen 62 presents, to a user, the washing condition corresponding to the washing operation so that the user can set the washing condition. At this time, as shown in FIG. 13 to FIG. 15, the controller 40 may display, for example, information related to a recommended washing operation in the information display box 62c, together with the washing condition corresponding to the washing operation. For example, the controller 40 performs screen display shown in FIG. 13 when the controller 40 has obtained the information 71 related to an operation schedule of the smear sample preparing apparatus 100 from the storage unit 41 and thereby has determined that it is the day before consecutive holidays.

In step S62, the controller 40 receives setting for the washing condition corresponding to the washing operation represented. The user confirms the washing condition corresponding to the washing operation on the operation screen 62, and sets the washing condition corresponding to the washing operation through an operation input to the check box 62b. When a washing condition corresponding to an appropriate washing operation has already been set on the operation screen 62, the user need not perform an operation input for setting the washing condition corresponding to the washing operation.

In step S63, the controller 40 receives an instruction to execute the washing operation corresponding to the washing condition. The user presses the button 62a. With the button 62a being pressed, the controller 40 receives the execution instruction for the washing operation corresponding to the washing condition, and advances the process to step S64. If an input operation on the button 62a has not been performed for a predetermined time period from when the operation screen 62 was displayed, the controller 40 may automatically advance the process to the next step S64 without receiving an input operation on the button 62a.

In step S64, the controller 40 determines the washing operation corresponding to the set washing condition. When the button 62a on the operation screen 62 has been pressed, then, if enhanced washing, which is the second washing condition corresponding to the second washing operation, is set to OFF in the check box 62b, the controller 40 determines that normal washing, which is the first washing condition corresponding to the first washing operation, has been set, and advances the process to step S65. If the enhanced washing as the second washing condition corresponding to the second washing operation is set to ON in the check box 62b, the controller 40 determines that the enhanced washing as the second washing condition corresponding to the second washing operation has been set, and advances the process to step S66.

In the case of step S65, the controller 40 controls the fluid circuit unit 30 so as to perform the first washing operation corresponding to the first washing condition. The controller 40 reads the set value of the first washing condition from the storage unit 41, and controls the fluid circuit unit 30 so as to perform supply and discharge of the washing liquid 81 with the washing liquid concentration and the holding time corresponding to the first washing condition.

As one example, the concentration of the diluted washing liquid is 50% in the first washing operation. The controller 40 causes the dilution chamber 860 and the dilution chamber 870 to prepare a diluted washing liquid, with the number N of times of discharge of the washing liquid 81 in undiluted form being equal to the number M of times of discharge of the diluent. The controller 40 controls the fluid circuit unit 30 so as to supply the prepared diluted washing liquid to the baths 23, 25, and 26.

Figure 22:
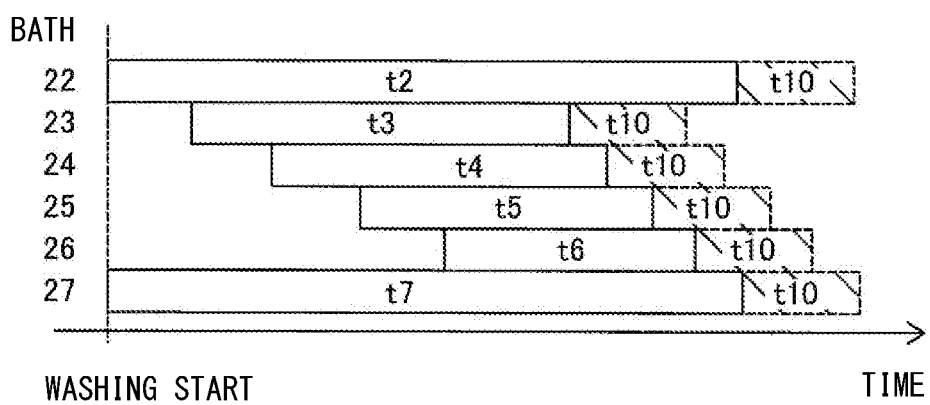
FIG. 22 shows examples of holding times in baths of the staining part.

The controller 40 controls the fluid circuit unit 30 so as to supply the washing liquid 81 in undiluted form to the bath 22 and the bath 24, and supply RO water to the bath 27. Since a part of the fluid circuit is shared, the washing liquid 81 is sequentially supplied to the respective baths at shifted timings as shown in FIG. 22.

In the washing condition corresponding to the first washing operation, a holding time t2 of the washing liquid 81 in the bath 22 is 15 [min], for example. A holding time t3 of the diluted washing liquid in the bath 23 is 7.5 [min], for example. A holding time t4 of the washing liquid 81 in the bath 24 is 7 [min], for example. A holding time t5 of the diluted washing liquid in the bath 25 is 6 [min], for example. A holding time t6 of the diluted washing liquid in the bath 26 is 4 [min], for example. A holding time t7 of the washing liquid (RO water) in the bath 27 is 17 [min], for example.

The controller 40 controls the fluid circuit unit 30 so as to discharge the washing liquid after the holding time has elapsed from each of the baths in the staining bath 20. The controller 40 causes the valves 814, 825, 864, 836, 875, 876, 854, disposed between the waste liquid chamber 880 and the baths 21, 22, 23, 25, and 26 and the baths 24 and 27 to be sequentially opened, thereby discharging the liquid in each bath into the waste liquid chamber 880.

In the case of step S66, the controller 40 controls the fluid circuit unit 30 so as to perform the second washing operation corresponding to the second washing condition. In the second washing operation corresponding to the second washing condition, the washing liquid concentration and the holding time that have been set on the reception screen 60 (see FIG. 5) are reflected. The controller 40 controls the fluid circuit unit 30 so as to read out the set value of the second washing condition corresponding to the second washing operation from the storage unit 41, and perform supply and discharge of the washing liquid 81 with the washing liquid concentration and the holding time corresponding to the second washing operation.

As one example, on the reception screen 60, the concentration of the diluted washing liquid in the second washing condition corresponding to the second washing operation is an arbitrary value within a range greater than 50 [%] and equal to or smaller than 100 [%]. Based on the value inputted to the concentration input box 60a, the controller 40 calculates the number N of times of discharge of the washing liquid 81 in undiluted form and the number M of times of discharge of the diluent, according to the above equations (1) and (2). The controller 40 causes the dilution chamber 860 and the dilution chamber 870 to prepare a diluted washing liquid with the number N of times of discharge and the number M of times of discharge calculated, and supply the diluted washing liquid to the baths 23, 25, and 26.

The controller 40 calculates holding times in the second washing condition corresponding to the second washing operation by adding the value (additional time t10) inputted to the time input box 60b to the holding times t2 to t7 in the first washing condition corresponding to the first washing operation. The controller 40 controls the fluid circuit unit 30 so as to discharge, from each bath, the washing liquid after the corresponding holding time has elapsed.

When the liquids in all the baths in the staining bath 20 have been discharged, the washing operation is ended. The controller 40 ends the washing operation control process in the shutdown process, and shuts down the smear sample preparing apparatus 100 by stopping supply of power to the respective components of the apparatus 100.

(Washing Operation Proposal Process)

Figure 23:
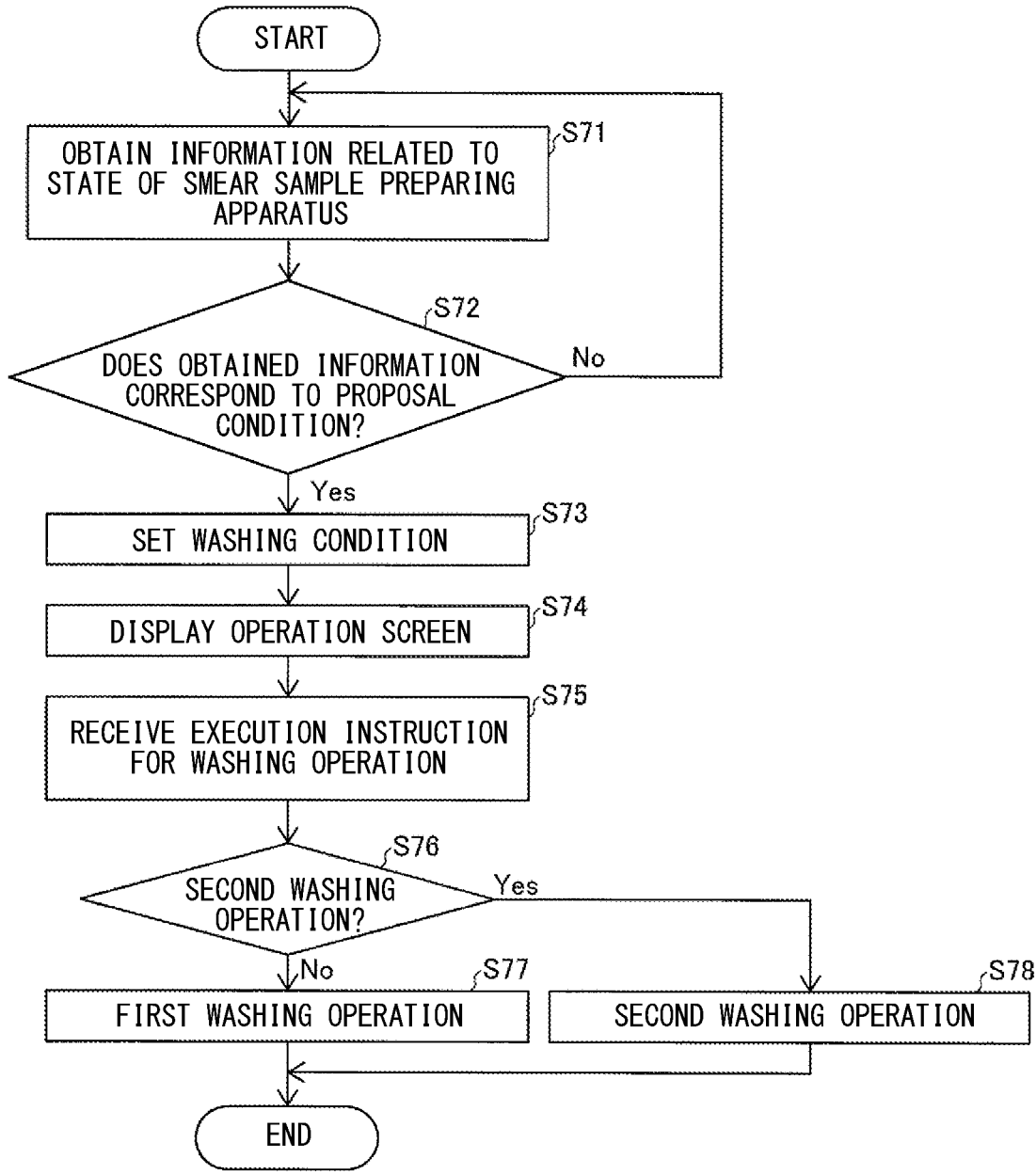
FIG. 23 is a flowchart of a washing operation proposal process.

Next, a proposal process in which the controller 40 proposes execution of a washing operation, based on information related to the state of the smear sample preparing apparatus 100, will be described with reference to FIG. 23. The proposal process can be performed when the smear sample preparing apparatus 100 is being operated, i.e., except when the smear sample preparing apparatus 100 is shut down.

In step S71, the controller 40 obtains information 70 (see FIG. 12) related to the state of the smear sample preparing apparatus 100. In step S72, the controller 40 determines whether or not the obtained information 70 corresponds to a proposal condition for proposing execution of the washing operation.

Specifically, the controller 40 obtains the information 72 (see FIG. 12) related to the discharge function for the liquid in the staining bath 20. The controller 40 obtains a time required for discharge of the staining liquid 91 when the staining liquid 91 in any of the baths 22, 23, 25, and 26 is replaced during operation of the smear sample preparing apparatus 100. For example, in the case of the bath 22, the controller 40 obtains a discharge time from when discharge of the staining liquid 91 is started with the valve 825 being opened to when the float switch 881 of the waste liquid chamber 880 is turned on. When the discharge time has exceeded a threshold value, the controller 40 determines that the information corresponds to the proposal condition for the washing operation.

The controller 40 obtains the information 73 (see FIG. 12) related to the continuous operation time of the smear sample preparing apparatus 100. The controller 40, by the clocking function thereof, obtains a continuous operation time from activation of the smear sample preparing apparatus 100 to the present time. When the continuous operation time has exceeded a threshold value, the controller 40 determines that the information corresponds to the proposal condition for the washing operation.

The controller 40 obtains information 74 (see FIG. 12) related to an observation result of a smear sample slide 12 stained by the smear sample preparing apparatus 100. That is, the controller 40 obtains, from the control device 320 through the communication unit 43, information about the number of artifacts detected by the sample image capturing device 310. When the number of artifacts has exceeded a threshold value, the controller 40 determines that the information corresponds to the proposal condition for the washing operation.

When the obtained information does not correspond to the proposal condition, the controller 40 returns to step S71, and repeats the information acquisition and the determination as to whether the information corresponds to the proposal condition. Upon determining that the obtained information corresponds to the proposal condition, the controller 40 advances to step S73.

In step S73, the controller 40 sets the washing condition based on the obtained information. That is, based on the information corresponding to the proposal condition, the controller 40 sets the second washing condition corresponding to the second washing operation having the higher washing effect.

In step S74, the controller 40 causes the display unit 50 to display the operation screen 62. On the displayed operation screen 62, as shown in FIG. 14, FIG. 15, the check box 62b of the enhanced washing, which is the second washing condition corresponding to the second washing operation, is in the ON state. On the operation screen 62, the controller 40 presents the washing operation corresponding to the set washing condition. In addition, according to the content of the information determined to correspond to the proposal condition, the controller 40 causes the information display box 62c to display information related to the condition corresponding to the recommended washing operation.

Since steps S75 to S78 are similar to steps S63 to S66 regarding the shutdown process shown in FIG. 21, detailed description thereof will be omitted. When the user inputs an execution instruction for a washing operation through the button 62a, the washing operation is started. If the user does not agree with the proposal of the controller 40, the user can delete the operation screen 62 without inputting an execution instruction, or the user can make a change to a washing operation other than the proposed washing operation and execute the washing operation. In the example of FIG. 23, the operation screen 62 is displayed on the display unit 50, and an execution instruction for a washing operation corresponding to a washing condition by the user is received. However, a washing operation corresponding to a washing condition may be automatically started without the operation screen 62 being displayed.

It should be noted that the embodiment disclosed herein is merely illustrative in all aspects and should not be considered as being restrictive. The scope of the present disclosure is not defined by the description of the above embodiment but by the scope of the claims, and includes meaning equivalent to the scope of the claims and all changes within the scope of the claims.

For example, in the above embodiment, the concentration input box 60a on the reception screen 60 shown in FIG. 5 is configured to allow input of the value of the concentration of the diluted washing liquid. However, instead of this configuration, the concentration input box 60a may be configured to allow input of the number N of times of discharge of the washing liquid 81 in undiluted form. Thus, the amount of the washing liquid 81 in undiluted form (i.e., the amount of methanol) contained in the diluted washing liquid can be directly designated, whereby the washing ability in the washing operation can be set more specifically.

The setting content displayed on the reception screen 60 may be made different between the user mode in which a user uses the smear sample preparing apparatus 100 and the service mode in which a service person uses the smear sample preparing apparatus 100 during maintenance thereof. For example, in the case of the user mode, the concentration input box 60a allows input of a value (%) of concentration of the diluted washing liquid. In the case of the service mode, the concentration input box 60a allows input of the number N of times of discharge of the washing liquid 81 in undiluted form. That is, in the service mode in which the service person having specialized knowledge uses the smear sample preparing apparatus 100, more detailed content of the washing operation than in the user mode may be set. In the embodiment shown in FIG. 4, the first washing operation is fixed and the second washing operation is variable. However, the first washing operation may be rewritten to the second washing operation to provide a single washing operation.

The washing operation for the staining bath 20 can be executed not only during the shutdown process but also during the operation of the smear sample preparing apparatus 100. As for the washing operation for the staining bath 20 during the operation of the apparatus 100, this washing operation can be performed during an operation for a staining liquid replacement process, for example.

(Staining Liquid Replacement Process)

The staining liquid replacement process is a process of discarding the staining liquid 91 stored in the staining bath 20, and supplying and storing new staining liquid 91 into the staining bath 20. In the staining liquid replacement process, a washing operation execution step includes steps of: discharging the staining liquid 91 from the staining bath 20; supplying the washing liquid 81 to the staining bath 20; discharging the washing liquid 81 from the staining bath 20; and supplying the staining liquid 91 to the staining bath 20. Thus, washing of the staining bath 20 by the washing liquid 81 is performed at the time of staining liquid replacement, whereby the staining liquid 91 can be supplied to the clean staining bath 20 in a cleaner state.

The staining liquid replacement process of the smear sample preparing apparatus 100 will be described with reference to FIG. 24 and FIG. 25. The staining liquid replacement process may include: a first staining liquid replacement process (see FIG. 24) of executing a washing operation for the staining bath 20 when the staining liquid 91 is replaced; and a second staining liquid replacement process (see FIG. 25) of replacing the staining liquid 91 without a washing operation for the staining bath 20 being executed.

The first staining liquid replacement process (with washing) is a process of executing the step of executing the washing operation in the staining liquid replacement process described above. That is, as shown in FIG. 24, the first staining liquid replacement process may include steps S101 to S105. The controller 40 controls the fluid circuit unit 30 so as to replace the staining liquid 91 in the staining bath 20 through step S101 of discharging the staining liquid 91 from the staining bath 20, step S102 of supplying the washing liquid 81 to the staining bath 20, step S104 of discharging the washing liquid 81 from the staining bath 20, and step S105 of supplying the staining liquid 91 to the staining bath 20.

Figure 24:
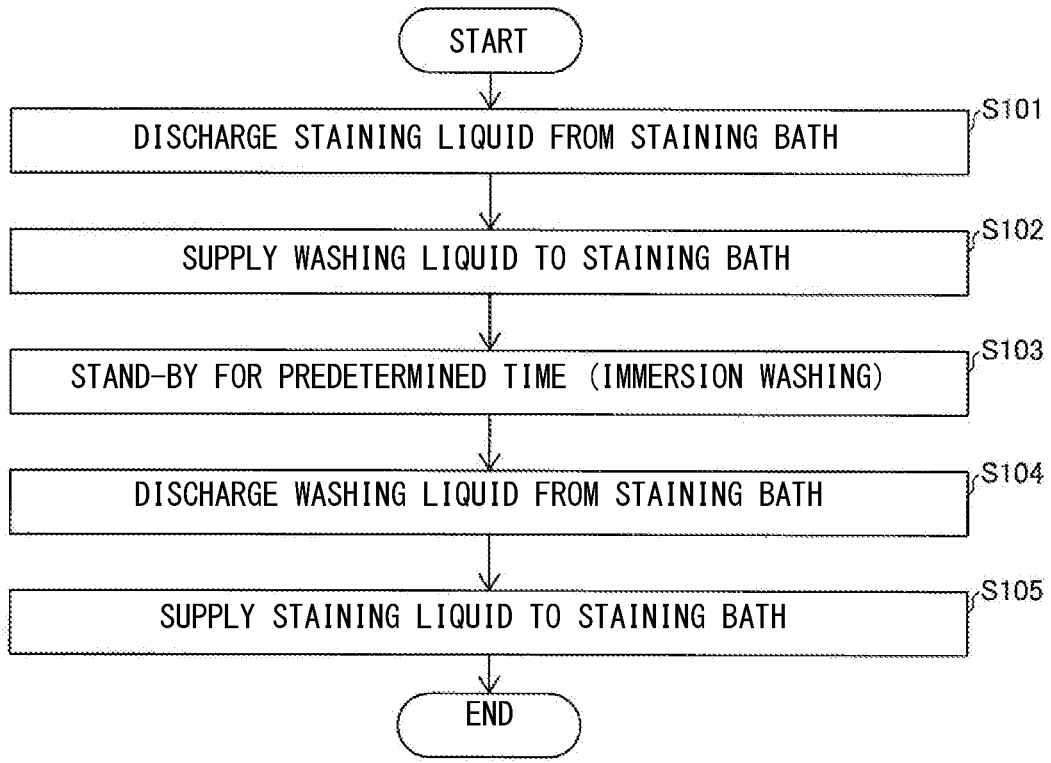
FIG. 24 is a flowchart of a first staining liquid replacement process.

FIG. 24 shows an example of a washing operation for performing immersion washing. In step S103, immersion washing in which the washing liquid 81 is kept stored for a predetermined holding time, is performed. The controller 40 counts the lapse of the holding time. Depending on the washing operation, step S103 can be omitted or changed to another step.

Figure 25:
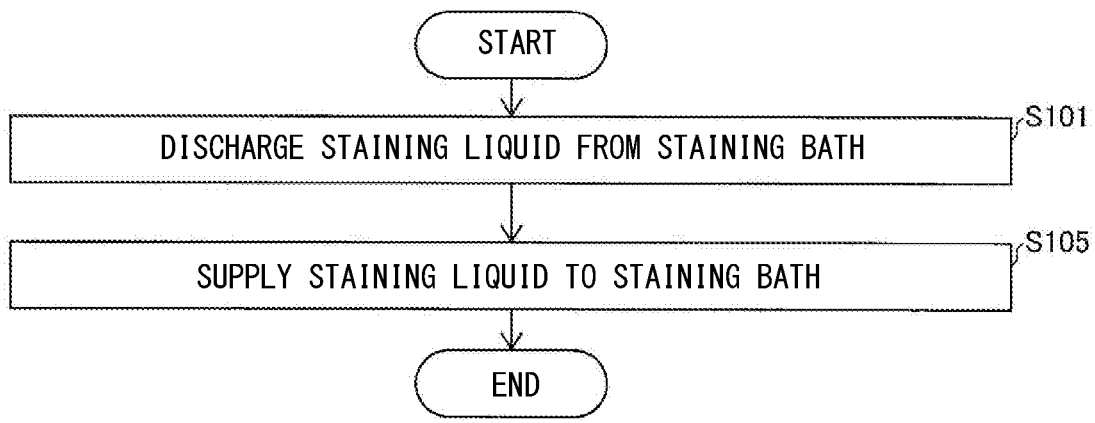
FIG. 25 is a flowchart of a second staining liquid replacement process.

As shown in FIG. 25, the second staining liquid replacement process (without washing) is a process of replacing the staining liquid 91 without the washing liquid 81 being supplied to the staining bath 20. In the second staining liquid replacement process, the controller 40 executes: step S101 of discharging the staining liquid 91 from the staining bath 20; and step S105 of supplying the staining liquid 91 to the staining bath 20 without the washing liquid 81 being supplied to the staining bath 20. The second staining liquid replacement process does not include step S102 of supplying the washing liquid 81 to the staining bath 20, step S103 of performing immersion washing in the washing liquid 81, and step S104 of discharging the washing liquid 81 in step S104, which are shown in FIG. 24. Since dirt in the staining bath 20 is partially reset by replacement with new staining liquid 91, even the second staining liquid replacement process provides a certain effect of reducing accumulation of dirt on the staining bath 20.

Since the washing process for the staining bath 20 is executed as the staining liquid replacement process during operation of the smear sample preparing apparatus 100, the washing process for the staining bath 20 can be performed without the apparatus 100 being shut down. That is, it is possible to omit processes, not directly related to the washing process for the target staining bath 20, such as initialization, restart, self-check, and the like of the apparatus 100, whereby the washing process for the staining bath 20 can be performed in a shorter time. In addition, in contrast to the shutdown process, the power supply is not turned off in the staining liquid replacement process. Therefore, the smear sample preparation operation can be smoothly resumed after the staining liquid replacement process.

When the smear sample preparing apparatus 100 needs to be continuously operated for long hours, the staining liquid replacement process is preferably executed automatically based on a condition setting. From the viewpoint of preventing accumulation of dirt and precipitation of solid components in the staining bath 20, a washing process using the washing liquid 81 is preferably executed in association with the staining liquid replacement process.

In one example, the first staining liquid replacement process and the second staining liquid replacement process are selectively executed. This allows selection between the first staining liquid replacement process accompanied by washing of the staining bath 20 with the washing liquid 81, and the second staining liquid replacement process not accompanied by washing of the staining bath 20 with the washing liquid 81. Therefore, when the staining liquid is replaced, a more appropriate process can be performed according to the state of the smear sample preparing apparatus 100. The selection is performed based on a setting input by the user. The selection may be performed by the controller 40 according to the state of the smear sample preparing apparatus 100. In another example, which of the first staining liquid replacement process and the second staining liquid replacement process should be executed may be set in advance so as not to be selectable, according to, for example, the type of liquid stored in each bath.

<Setting Input Screen for Staining Liquid Replacement Process>

Figure 26:
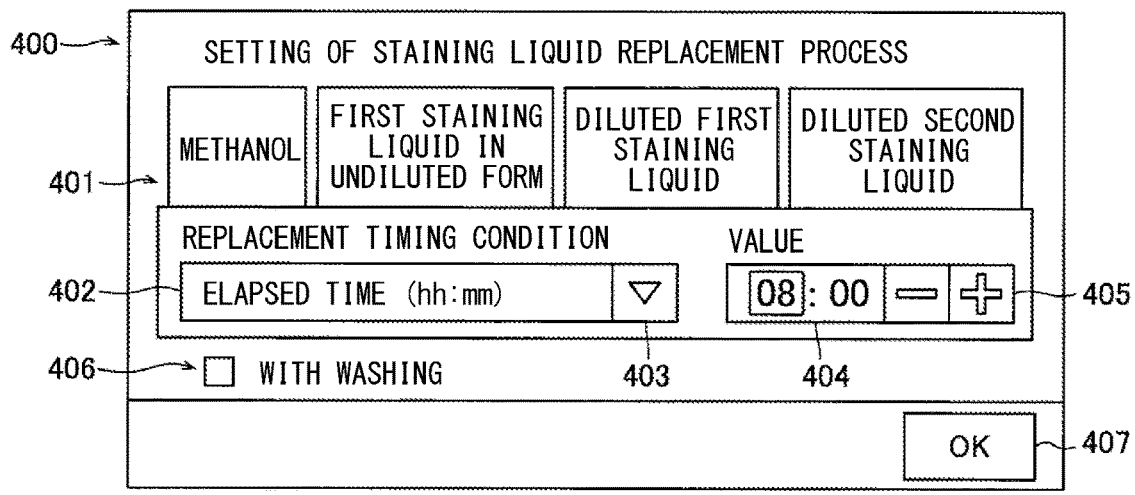
FIG. 26 shows an example of a setting input screen for the staining liquid replacement process.

FIG. 26 shows a setting input screen 400 for the staining liquid replacement process. In the example shown in FIG. 26, the controller 40 is configured to execute: a process of variably displaying a set value related to a washing process using the washing liquid 81 on the setting input screen 400; and a staining liquid replacement process according to the set value related to the washing process. Thus, an appropriate washing process according to the setting can be performed when the staining liquid is replaced.

The setting input screen 400 includes a liquid selection part 401 for receiving selection of a liquid to be replaced. In FIG. 26, the liquid selection part 401 is indicated by tabs. A user selects and inputs any one of the tabs, thereby setting a replacement process for the selected liquid. In the example shown in FIG. 26, replaceable liquids are methanol, the first staining liquid in undiluted form, the diluted first staining liquid, and the diluted second staining liquid. As shown in FIG. 19, methanol is supplied to the bath 21, the first staining liquid in undiluted form is supplied to the bath 22, the diluted first staining liquid is supplied to the bath 23, and the diluted second staining liquid is supplied to the bath 25 or to both the bath 25 and the bath 26.

On the setting input screen 400, settings as follows can be made individually for the replaceable liquids.

In FIG. 26, "replacement timing condition" indicates an execution condition for the staining liquid replacement process. By pressing an operation button 403 in a pull-down type condition display box 402, the user can select "elapsed time (HH:mm)", "designated time (HH:mm)", and "no liquid replacement". The value of the selected replacement timing condition can be set by operating an increment (+)/decrement (−) button 405 in a value display box 404.

The "elapsed time" is a time elapsed from the most recent start time. The settable value is a time length (e.g., X hours and Y minutes). The start time is when apparatus activation is completed or when the staining liquid replacement process is completed after the apparatus activation.

The "designated time" is a set time in a day. A settable value is a time (e.g., X o'clock, Y minutes).

As for "no liquid replacement", this means that automatic staining liquid replacement process is not performed.

As for "with washing", whether or not to perform washing with the washing liquid 81 can be set by ON/OFF of a check box 406. As for the washing liquid 81 to be used, for example, the washing liquid 81 according to the first washing condition shown in FIG. 4 can be set.

Regarding the check box 406, as shown in FIG. 4, a plurality of options may be presented on the setting input screen 400 so as to correspond to a plurality of washing operations having different washing effects. For example, both the check box 406 for "with washing" and the check box 62b for "with enhanced washing" (see FIG. 9, FIG. 10) may be displayed on the setting input screen 400, so that the user can select one of the normal washing as the first washing condition and the enhanced washing as the second washing condition. Thus, an appropriate washing process can be executed for the staining bath 20 according to the usage state of the smear sample preparing apparatus 100.

The information set on the setting input screen 400 is stored in the storage unit 41 when an OK button 407 is pressed.

At the time of shutdown (see FIG. 21), the washing operation is performed for all the baths 21 to 27 (see FIG. 19). Meanwhile, during the staining liquid replacement process, the washing operation is performed for some of the baths. When the smear sample slides 12 are stained, the bath 24 for the specimen washing liquid (buffer) and the bath 27 for RO water (pure water) are subjected to liquid replacement periodically (e.g., for each slide 12). Therefore, the baths 24 and 27 are excluded from the targets of the staining liquid replacement process in this example. In addition, since no staining liquid 91 mixes in the bath 21, methanol in the bath 21 may also be excluded from the targets of the staining liquid replacement process.

The likelihood of dirt varies depending on the component of the liquid stored in each bath. Therefore, in one example, when the first staining liquid replacement process is selected, the first staining liquid replacement process is executed for a bath in which a predetermined liquid is stored, among the plurality of baths, according to the selection. According to the selection, the controller 40 executes the first staining liquid replacement process for the bath in which the predetermined liquid is stored, among the plurality of baths. Thus, for example, a bath, in which a specific staining liquid 91 that easily causes precipitates is stored, can be washed at the time of staining liquid replacement, whereby adhesion of dirt on the staining bath 20 can be effectively inhibited.

For example, the predetermined liquid is a diluted staining liquid including phosphate buffer. The diluted staining liquid obtained through dilution with the phosphate buffer is likely to cause precipitates of phosphate with elapse of the storage time. Therefore, the bath, in which the diluted staining liquid including the phosphate buffer is stored, is washed at the time of staining liquid replacement, whereby precipitates in the bath that is likely to become dirty can be effectively removed.

In the example shown in FIG. 19, the first staining liquid diluted by the phosphate buffer is stored in the bath 23, and the second staining liquid diluted by the phosphate buffer is stored in both the bath 25 and the bath 26. Therefore, when the first staining liquid replacement process is selected, the bath washing operation is preferably performed for at least the bath 23, the bath 25, and the bath 26. In the example shown in FIG. 26, when the check box 406 is valid, the washing operation is performed not only for the bath 23, the bath 25, and the bath 26 storing the predetermined liquid therein but also for the bath 21 and the bath 22. That is, in the example shown in FIG. 26, when the check box 406 is valid, the washing operation is performed for all the baths to be subjected to the staining liquid replacement process. As for the bath 21 storing methanol therein and the bath 22 storing therein the first staining liquid in undiluted form, i.e., not diluted by the phosphate buffer, since precipitates are relatively less likely to be generated in these baths, the second staining liquid replacement process may be performed even when the check box 406 is valid.

In another example, the first staining liquid replacement process or the second staining liquid replacement process may be selected and executed for each of a plurality of baths. In this case, the controller 40 is configured to be able to select the first staining liquid replacement process or the second staining liquid replacement process for each of the plurality of baths. Thus, whether or not to perform washing at the time of staining liquid replacement can be selected for each of the baths storing the staining liquid 91 therein, depending on the property of the staining liquid 91 such as likelihood of precipitates. For example, in FIG. 26, whether the check box 406 is valid or invalid may be settable for each of the four liquids indicated by tabs in the liquid selection unit 401.

<Control Process at Staining Liquid Replacement>

A control process at the time of staining liquid replacement, which is executed based on information set on the setting input screen 400, will be described with reference to FIG. 27.

Figure 27:
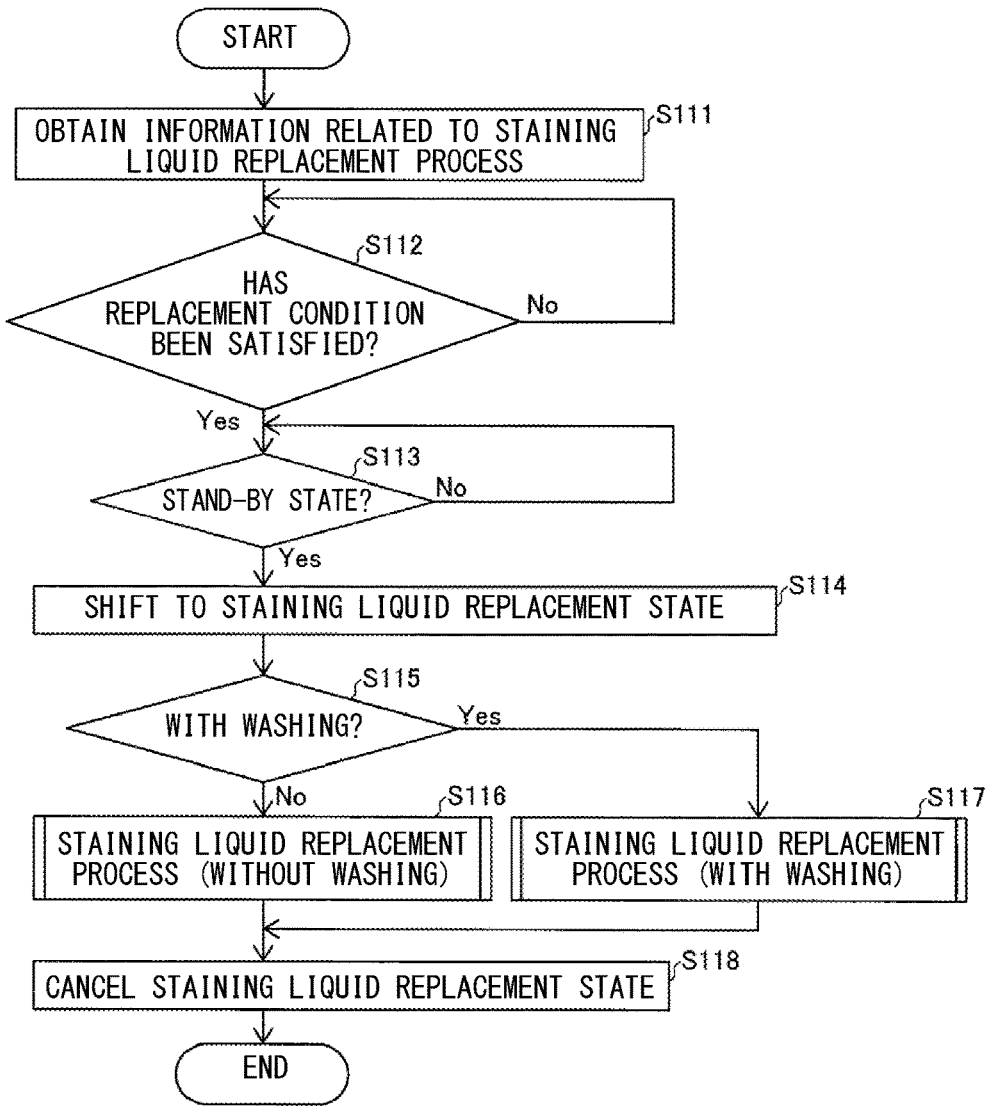
FIG. 27 is a flowchart of a control process at staining liquid replacement.

In step S111 in FIG. 27, the controller 40 obtains, from the storage unit 41, the set information related to the staining liquid replacement process. The information related to the staining liquid replacement process includes a replacement timing condition set on the setting input screen 400, and whether the check box 406 is valid or invalid.

In step S112, based on the set replacement timing condition, the controller 40 determines whether or not the replacement timing condition for the staining liquid replacement process is satisfied. When the replacement timing condition is not satisfied, the controller 40 repeats the determination in step S112 until the replacement timing condition is satisfied. When the replacement timing condition is satisfied, the controller 40 advances the process to step S113.

In step S113, the controller 40 determines whether or not the state of the smear sample preparing apparatus 100 is a stand-by state. Since the staining liquid replacement process is executed at least when the smear sample preparing apparatus 100 does not execute a process using the staining bath 20, if the state of the smear sample preparing apparatus 100 is not the stand-by state, the controller 40 repeats the determination in step S113 until the state of the smear sample preparing apparatus 100 becomes the stand-by state. When the state of the smear sample preparing apparatus 100 is the stand-by state, the controller 40 advances the process to step S114.

The "stand-by state" is a state in which the smear sample preparing apparatus 100 has completed preparation for operation, but does not yet perform processing operation and waits for an instruction. In other words, the "stand-by state" is a ready state. Specifically, in the stand-by state, none of specimen aspiration, smearing, staining, smear sample preparation and storage, staining liquid replacement, and shutdown has been performed. The controller 40 does not execute the staining liquid replacement process unless the smear sample preparing apparatus 100 is in the stand-by state. Thus, as for a process being executed, this process is not suspended but is completed before the staining liquid replacement process is started.

In step S114, the controller 40 shifts the state of the smear sample preparing apparatus 100 from the stand-by state to the staining liquid replacement state. Once the smear sample preparing apparatus 100 is shifted to the staining liquid replacement state, even when the controller 40 receives an aspiration process for a new specimen by the smear sample preparing apparatus 100 or a staining process for a glass slide 11 having the specimen smeared thereon, which is set in the slide setting unit 170, the controller 40 maintains the stand-by state and does not execute the process until the staining liquid replacement state is released. In this case, the specimen stands by in the specimen transport unit 210, and the glass slide 11 stands by in the slide setting unit 170.

In step S115, the controller 40 determines information related to the washing condition, based on the information set on the setting input screen 400. Specifically, the controller 40 determines whether the check box 406 for "with washing" on the setting input screen 400 is valid or invalid, and executes the staining liquid replacement process in step S116 or step S117 according to the determined washing condition.

When the check box 406 for "with washing" is invalid (i.e., not checked), the controller 40 executes the second staining liquid replacement process not accompanied by a washing process in step S116. That is, steps S101 and S105 shown in FIG. 25 are executed.

When the check box 406 for "with washing" is valid (i.e., checked), the staining liquid replacement process accompanied by a washing process using the washing liquid 81 is executed. The controller 40 executes the first staining liquid replacement process accompanied by the washing process in step S117. That is, steps S101 to S105 shown in FIG. 24 are executed. As for the washing process using the washing liquid 81, the washing process using the washing liquid 81 which is set as the aforementioned first washing condition (see FIG. 4) is executed.

As shown in FIG. 4, when there are a plurality of settable washing conditions, a staining liquid replacement process according to the set condition is executed. For example, selection from three options, "without washing", "with washing", and "with enhanced washing", is possible. In this case, any of "second staining liquid replacement process without washing", "first staining liquid replacement process (with washing) according to the first washing condition", and "first staining liquid replacement process (with enhanced washing) according to the second washing condition" is executed according to the selection.

A liquid to be replaced and a washing liquid 81 to be used in the first staining liquid replacement process will be described for each bath.

Bath 21: the liquid to be replaced is methanol, and the washing liquid 81 to be used is the washing liquid (methanol) in undiluted form.

Bath 22: the liquid to be replaced is the first staining liquid in undiluted form, and the washing liquid 81 to be used is the washing liquid (methanol) in undiluted form.

Bath 23: the liquid to be replaced is the diluted first staining liquid, and the washing liquid 81 to be used is the diluted washing liquid obtained by diluting the washing liquid (methanol) in undiluted form.

Bath 25, bath 26: the liquid to be replaced is the diluted second staining liquid, and the washing liquid 81 to be used is the diluted washing liquid obtained by diluting washing liquid (methanol) in undiluted form.

The concentration of each diluted washing liquid is based on the set value of the corresponding washing condition shown in FIG. 4.

When the staining liquid replacement process has been completed in step S116 or step S117, the controller 40, in step S118, releases the smear sample preparing apparatus 100 from the staining liquid replacement state. Thus, the smear sample preparing process, etc., become executable. When there is a process order, the controller 40 executes the process according to the order. When there is no process order, the controller 40 goes to the stand-by state. Thus, the staining liquid replacement process is performed.

In the flow shown in FIG. 27, the staining liquid replacement process is executed when the staining liquid replacement timing condition is satisfied and the smear sample preparing apparatus 100 is in the stand-by state. Therefore, even when the staining liquid replacement timing condition has been satisfied, for example, the smear sample preparing process is performed while an order for the smear sample preparing process is present, until the order is gone, and then the staining liquid replacement process is executed at the timing when the smear sample preparing apparatus 100 shifts to the stand-by state. Instead of this, when the staining liquid replacement timing condition has been satisfied, the staining liquid replacement process may be executed even if the smear sample preparing apparatus 100 is not in the stand-by state. In this case, the staining liquid replacement process is performed in an interruption manner, i.e., preferentially over another unexecuted process. After the staining liquid replacement process has been completed, the other unexecuted process, which has been in a stand-by state, is executed.

A staining liquid replacement process and a washing operation may be performed in parallel to another process executed by the smear sample preparing apparatus 100. The staining liquid replacement process can be performed under a situation where at least the staining bath 20 is not used. Therefore, for example, the staining liquid replacement process may be performed while the smear sample preparing apparatus 100 is operated in the smearing mode in which only the printing process of the printing unit 130 and the smearing process of the smearing unit 140 are performed, or in the printing mode in which only the printing process is performed. In other words, at least one of the printing process and the smearing process may be executed during steps S114 to S118 in which the state of the smear sample preparing apparatus 100 is the staining liquid replacement state.

(Other Smear Sample Preparing Apparatuses)

Figure 28:
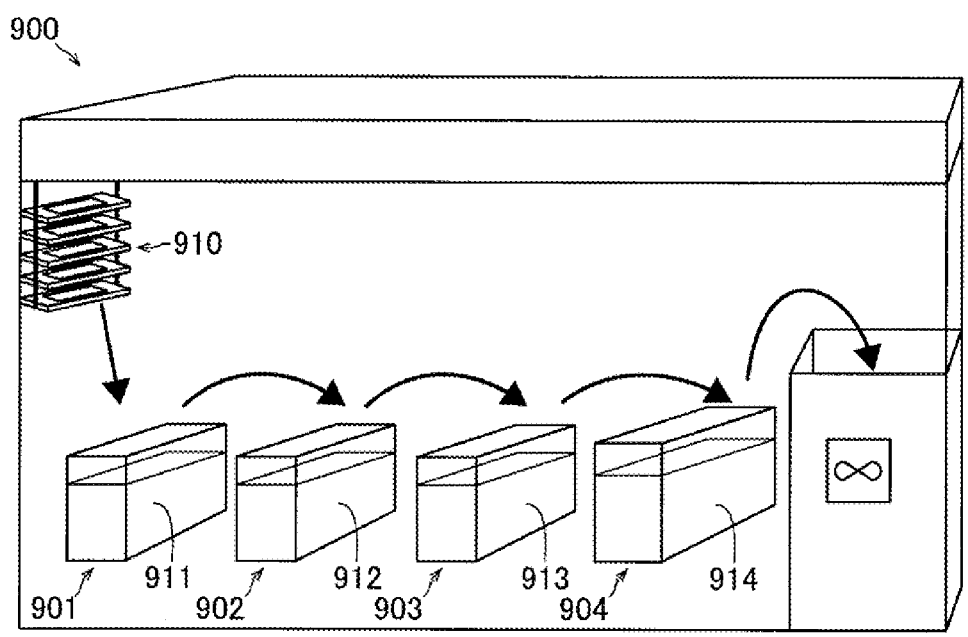
FIG. 28 is a schematic diagram showing a conventional smear sample preparing apparatus.

In the above description, the smear sample preparing apparatus 100 is of a type in which smeared glass slides 11 are one by one taken in and out of the staining bath 20 in which the staining liquid 91 is stored, as shown in FIG. 18. However, the present invention is not limited thereto. For example, the present invention may be applied to an apparatus of a type in which a plurality of smeared glass slides are stored in a rack or a basket, and the rack or the basket is sequentially taken in and out of staining baths in which staining liquids are stored, as shown in FIG. 28.

In the example shown in FIG. 18 and FIG. 19, supply of liquid to each bath in the staining bath 20 and discharge of liquid from each bath can be performed through a liquid inflow port and a liquid outflow port provided for each bath at the wall surface or the bottom surface of the bath. In another example, supply of liquid to each bath and discharge of liquid from each bath may be performed through a liquid inflow pipe and a liquid outflow pipe provided for each bath so as to be disposed from an opening of the bath toward the bottom surface of the bath.

What is claimed is:

1. A washing method for a staining bath in a smear sample preparing apparatus, the staining bath being able to accommodate a glass slide having a specimen smeared thereon, the staining bath being able to store therein a staining liquid for staining the specimen smeared on the glass slide to perform a staining process, the washing method comprising:
receiving information related to a washing condition,
wherein the receiving of the information includes: presenting a reception screen for receiving a setting of a washing condition; and receiving, as the information, a setting of a washing condition through the reception screen, wherein the setting includes a set value of a washing liquid concentration and a set value of a holding time; and
executing a washing operation for the staining bath, according to the received information, wherein the executing of the washing operation includes:
discharging the staining liquid from the staining bath;
supplying a washing liquid to the staining bath; and
discharging the washing liquid from the staining bath,
wherein the holding time is a time period from when the washing liquid is supplied to the staining bath to when the washing liquid is discharged from the staining bath.

2. The washing method of claim 1, wherein
the smear sample preparing apparatus is configured to operate in a plurality of modes, and
the plurality of modes include a first mode in which the reception screen is displayed, and a second mode in which the reception screen is not displayed.

3. The washing method of claim 1, wherein the receiving of the information includes:
presenting an operation screen for receiving an instruction to execute a first washing operation of executing a washing operation for the staining bath with a first washing condition, or a second washing operation of executing a washing operation for the staining bath with a second washing condition different from the first washing condition; and
receiving, as the information, an instruction to execute at least one of the first washing operation and the second washing operation.

4. The washing method of claim 1, wherein the receiving of the information includes:
selectively presenting a plurality of washing conditions; and
receiving, as the information, selection of any of the presented washing conditions.

5. The washing method of claim 1, wherein the washing condition includes a condition related to a washing time.

6. The washing method of claim 1, wherein the receiving of the information includes:
obtaining, as the information, information related to a degree of dirt of the staining bath; and
setting a washing condition based on the obtained information.

7. The washing method of claim 1, wherein the receiving of the information includes:
obtaining, as the information, information related to a state of the smear sample preparing apparatus; and
setting a washing condition based on the obtained information.

8. The washing method of claim 7, wherein
the information related to the state of the smear sample preparing apparatus includes at least one of: information related to an operation schedule of the smear sample preparing apparatus; information related to a discharge function for liquid in the staining bath; information related to a continuous operation time of the smear sample preparing apparatus; and information related to an observation result of a smear sample slide smeared by the smear sample preparing apparatus.

9. The washing method of claim 1, wherein the receiving of the information includes:
obtaining, as the information, information related to a state of the smear sample preparing apparatus;
presenting a recommendation screen for receiving setting of a washing condition based on the obtained information; and
receiving, as the information, setting of a washing condition through the recommendation screen.

10. The washing method of claim 9, wherein the presenting of the recommendation screen includes presenting information related to the state of the smear sample preparing apparatus.

11. The washing method of claim 1, wherein the washing condition includes a condition related to concentration of a washing liquid, and the concentration of the washing liquid varies.

12. The washing method of claim 11, wherein the executing of the washing operation includes preparing the washing liquid at a mixing ratio of the washing liquid in undiluted form to a diluent, according to the washing condition.

13. The washing method of claim 1, wherein the executing of the washing operation further includes:
supplying the staining liquid to the staining bath.

14. The washing method of claim 13, wherein
a first staining liquid replacement process of performing the executing of the washing operation, and
a second staining liquid replacement process of performing the discharging of the staining liquid from the staining bath, and the supplying of the staining liquid to the staining bath without the washing liquid being supplied to the staining bath, are selectively executed.

15. The washing method of claim 14, wherein
the staining bath includes a plurality of baths storing therein different liquids, and
the first staining liquid replacement process or the second staining liquid replacement process is selectively executed for each of the plurality of baths.

16. The washing method of claim 14, wherein
the staining bath includes a plurality of baths storing different liquids therein, and
the first staining liquid replacement process is executed for a bath storing a predetermined liquid therein among the plurality of baths, according to the selection.

17. The washing method of claim 16, wherein the predetermined liquid is a diluted staining liquid containing phosphate buffer.

18. A washing method for a staining bath in a smear sample preparing apparatus operable in a plurality of operation modes, the staining bath being able to accommodate a glass slide having a specimen smeared thereon, the staining bath being able to store therein a staining liquid for staining the specimen smeared on the glass slide to perform a staining process, the washing method comprising:
receiving information related to a washing condition,
wherein the receiving of the information includes: presenting a reception screen for receiving a setting of a washing condition; and receiving, as the information, a setting of a washing condition through the reception screen, wherein the setting includes a set value of a washing liquid concentration and a set value of a holding time, wherein the holding time is a time period from when a washing liquid is supplied to the staining bath to when the washing liquid is discharged from the staining bath;
selecting at least one operation mode from among the plurality of operation modes according to the received information; and
executing a washing operation for the staining bath, according to the selected operation mode.

* * * * *